US011131978B2

(12) United States Patent
Holverson et al.

(10) Patent No.: US 11,131,978 B2
(45) Date of Patent: Sep. 28, 2021

(54) SYSTEMS AND METHODS FOR ANALYZING MANUFACTURING PARAMETERS

(71) Applicant: ILLINOIS TOOL WORKS INC., Glenview, IL (US)

(72) Inventors: Todd Earl Holverson, Appleton, WI (US); Caleb Robert Krisher, Appleton, WI (US); Adam Kirk Pliska, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 687 days.

(21) Appl. No.: 15/383,729

(22) Filed: Dec. 19, 2016

(65) Prior Publication Data

US 2017/0185058 A1 Jun. 29, 2017

Related U.S. Application Data

(60) Provisional application No. 62/271,793, filed on Dec. 28, 2015.

(51) Int. Cl.
*G05B 19/048* (2006.01)
*G06Q 10/06* (2012.01)

(52) U.S. Cl.
CPC .......... *G05B 19/048* (2013.01); *G06Q 10/06* (2013.01); *G05B 2219/32366* (2013.01)

(58) Field of Classification Search
None
See application file for complete search history.

(56) References Cited

U.S. PATENT DOCUMENTS 4,825,038 A 4/1989 Smartt
6,486,439 B1 * 11/2002 Spear .................. B23K 9/1062
219/136

(Continued)

FOREIGN PATENT DOCUMENTS

CN 1778990 5/2006
CN 101978389 2/2011

(Continued)

OTHER PUBLICATIONS

'How to Measure Performance—A Handbook of Techniques and Tools,' U.S. Department of Energy, Oct. 1, 1995, http://www.orau.gov/pbm/handbook/handbook_all.pdf.

(Continued)

*Primary Examiner* — Roy Y Yi
(74) *Attorney, Agent, or Firm* — McAndrews, Held & Malloy, Ltd.

(57) ABSTRACT

A metal fabrication resource performance monitoring method includes collecting data representative of a parameter sampled during one or more metal fabrication operations of one or more metal fabrication resources, the one or more resources being selectable by a user from a listing of individual and groups of resources, receiving event data comprising a time that an event occurred, via at least one computer processor, determining a first analyzed system parameter from the collected data, via the at least one computer processor, populating a dashboard page with graphical indicia representative of the first analyzed system parameter before and after the event, and transmitting the dashboard page to a user-viewable display.

22 Claims, 16 Drawing Sheets

(56) References Cited

U.S. PATENT DOCUMENTS

| | | |
|---|---|---|
| 6,624,388 B1 | 9/2003 | Blankenship |
| 6,636,776 B1 | 10/2003 | Barton |
| 6,797,921 B1 | 9/2004 | Niedereder |
| 6,809,292 B2 | 10/2004 | Spear |
| 6,858,817 B2 | 2/2005 | Blankenship |
| 6,924,459 B2 | 8/2005 | Spear |
| 7,041,936 B2 | 5/2006 | Oberzaucher |
| 7,643,890 B1 | 1/2010 | Hillen |
| 7,908,302 B1 | 3/2011 | Nagaralu |
| 2004/0099648 A1 | 5/2004 | Hu |
| 2004/0262279 A1 | 12/2004 | Spear |
| 2005/0133488 A1 | 6/2005 | Blankenship |
| 2008/0078811 A1 | 4/2008 | Hillen |
| 2008/0149686 A1 | 6/2008 | Daniel |
| 2009/0173726 A1 | 7/2009 | Davidson |
| 2009/0234483 A1 | 9/2009 | Leko |
| 2009/0313549 A1 | 12/2009 | Casner |
| 2009/0327035 A1 | 12/2009 | Allard |
| 2010/0224610 A1 | 9/2010 | Wallace |
| 2010/0257228 A1 | 10/2010 | Staggs |
| 2010/0299185 A1 | 11/2010 | Caro |
| 2011/0114615 A1 | 5/2011 | Daniel |
| 2011/0117527 A1 | 5/2011 | Conrardy |
| 2011/0172796 A1 | 7/2011 | Sohmshetty |
| 2012/0136692 A1 | 5/2012 | Ohishi |
| 2012/0193330 A1 | 8/2012 | Edwards |
| 2012/0226478 A1 | 9/2012 | Bender |
| 2013/0075380 A1 | 3/2013 | Albrech |
| 2014/0272838 A1* | 9/2014 | Becker ............... G09B 19/24 434/234 |
| 2014/0277684 A1* | 9/2014 | Larners ............... G05B 15/02 700/145 |
| 2014/0278242 A1 | 9/2014 | Lamers |
| 2014/0278243 A1 | 9/2014 | Lamers |
| 2015/0012865 A1 | 1/2015 | Lamers |
| 2015/0019594 A1 | 1/2015 | Lamers |
| 2015/0121309 A1 | 4/2015 | Reed |

FOREIGN PATENT DOCUMENTS

| | | |
|---|---|---|
| CN | 102922089 | 2/2013 |
| EP | 1295673 A1 | 3/2003 |
| EP | 1958738 | 8/2008 |
| GB | 2454232 A | 5/2009 |
| JP | H1147950 | 2/1999 |
| JP | 2003211378 A | 7/2003 |
| KR | 20120017189 | 2/2012 |
| WO | 02058878 A1 | 8/2002 |
| WO | 2012000650 | 1/2012 |

OTHER PUBLICATIONS

Gilsinn, Jim et al.: "A Welding Cell That Supports Remote Collaboration", Ninth International Conference on Computer Technology in Welding, Sep. 30, 1999.

International Search Report from PCT application No. PCT/US2016/068407, dated Feb. 17, 2017, 10 pgs.

Canadian Office Action Appln. No. 3,006,595 dated Mar. 25, 2019, 4 pages.

Canadian Office Action Appln. No. 3,006,595 dated Mar. 5, 2020, 5 pages.

* cited by examiner

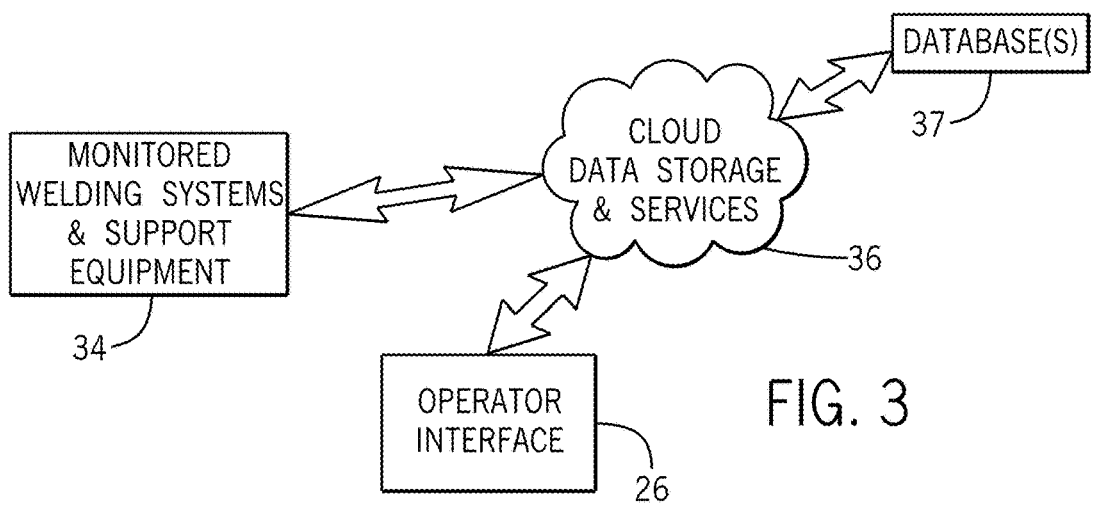
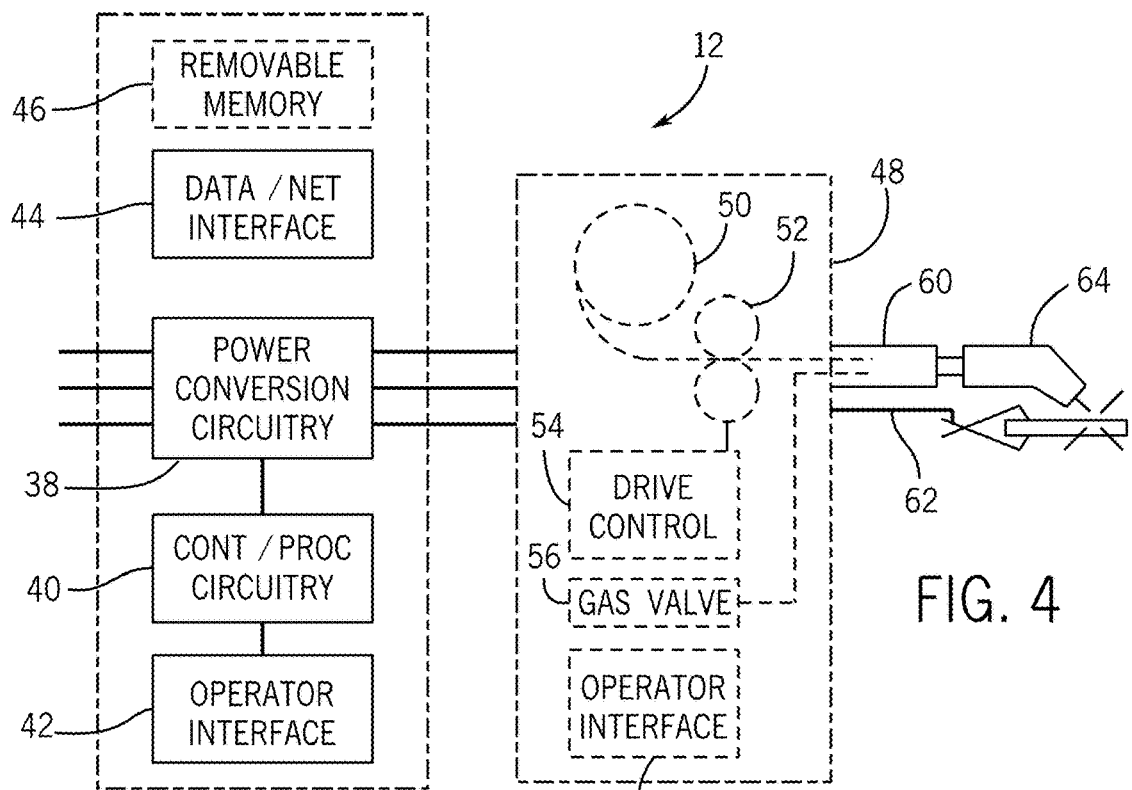
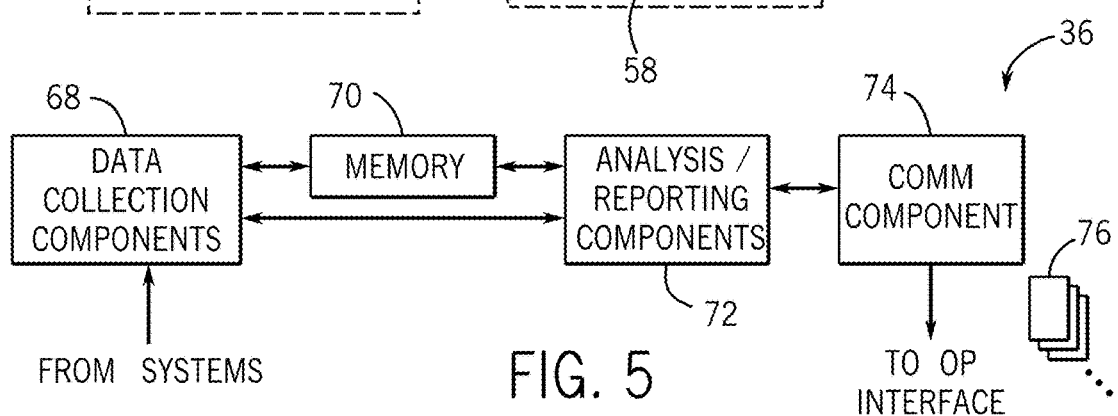

FIG. 10

ADD /EDIT EVENT

NAME | JOHN DOE

EVENT TYPE | NEW AUTOMATION ▶
| MAINTENANCE
| NEW PARTS
| NEW OPERATOR
| TRAINING COMPLETED

EVENT DATE | 03-18-2015

COMMENTS | NEW WELDING ROBOT INSTALLED. TRANSITION FROM HAND-HELD TO AUTOMATED WELDING.

SAVE
CANCEL

FIG. 17

SYSTEMS AND METHODS FOR ANALYZING MANUFACTURING PARAMETERS

CROSS REFERENCE TO RELATED APPLICATION

This application claims priority to and benefit of U.S. Provisional Application No. 62/271,793, entitled "System and Methods for Analyzing Welding System Parameters Before and After an Event", filed Dec. 28, 2015, which is herein incorporated by reference in its entirety.

BACKGROUND

The present disclosure relates generally to analyzing manufacturing and/or fabrication processes, including heating systems, cutting systems, welding systems and support equipment for heating, cutting, and welding operations. In particular, the present disclosure relates to identifying factors associated with improvements and/or regressions in manufacturing and/or fabrication processes.

A wide range of metal fabrication systems have been developed, along with ancillary and support equipment for various fabrication, repair, and other applications. For example, welding systems are ubiquitous throughout industry for assembling parts, structures and sub-structures, frames, and many components. These systems may be manual, automated or semi-automated. A modern manufacturing and fabrication entity may use a large number of metal fabrication systems, and these may be grouped by location, task, job, part, operator, equipment, and so forth. Smaller operations may use metal fabrication systems from time to time, but these are often nevertheless critical to their operations. For some entities and individuals, metal fabrication systems may be stationary or mobile, such as mounted on carts, trucks, and repair vehicles. In all of these scenarios it is increasingly useful to set, monitor, and analyze performance, quality, or maintenance information and, wherein possible, report performance, quality, or maintenance information to the operator and/or to management teams and engineers. Such analysis allows for planning of resources, determinations of prices and profitability, scheduling of resources, enterprise-wide accountability, planning scheduled downtime, conducting audits, among many other uses.

Systems designed to gather, store, analyze and report welding system information have not, however, reached a point where they are easily and effectively utilized. In some entities, limited tracking of welds, weld quality, and system and operator performance may be available. However, these do not typically allow for any significant degree of analysis, tracking or comparison. Improvements are needed in such tools. More specifically, improvements would be useful that allow for data to be gathered at one or multiple locations and from one or multiple systems, analysis performed, and reports generated and presented at the same or other locations. Other improvements might include the ability to retrospectively review performance, quality, or maintenance information before and after events occur or modifications are made.

BRIEF DESCRIPTION

Certain embodiments commensurate in scope with the original claims are summarized below. These embodiments are not intended to limit the scope of the claims, but rather these embodiments are intended only to provide a brief summary of possible forms of the claimed subject matter. Indeed, the claims may encompass a variety of forms that may be similar to or different from the embodiments set forth below.

In one embodiment, a metal fabrication resource performance monitoring method includes collecting data representative of a parameter sampled during one or more metal fabrication operations of one or more metal fabrication resources, the resources being selectable by a user from a listing of individual and groups of resources, receiving event data comprising a time that an event occurred, via at least one computer processor, determining a first analyzed system parameter from the collected data, via the at least one computer processor, populating a dashboard page with graphical indicia representative of the first analyzed system parameter before and after the event, and transmitting the dashboard page to a user-viewable display.

In another embodiment, a manufacturing performance monitoring method includes collecting data representative of a plurality of parameters sampled during a manufacturing operation of a first manufacturing resource, the resource being selectable by a user from a listing of individual and groups of resources, via at least one computer processor, determining a first analyzed system parameter from the plurality of parameters, detecting a change in the first analyzed system parameter beyond a threshold value, via the at least one computer processor, populating a dashboard page with graphical indicia representative of the first analyzed system parameter before and after the change occurred, and transmitting the dashboard page to a user viewable display.

In a third embodiment, a non-transitory tangible computer readable medium includes executable instructions that when executed cause a processor to collect data representative of a parameter sampled during one or more metal fabrication operations of one or more metal fabrication resources, the one or more metal fabrication resources being selectable by a user from a listing of individual and groups of resources, receive event data comprising a time that an event occurred, determine a first analyzed system parameter from the collected data, populate a dashboard page with graphical indicia representative of the first analyzed system parameter before and after the event, and transmit the dashboard page to a user-viewable display.

DRAWINGS

These and other features, aspects, and advantages of the present disclosure will become better understood when the following detailed description is read with reference to the accompanying drawings in which like characters represent like parts throughout the drawings, wherein:

FIG. 3 is a diagrammatical representation of an exemplary cloud-based implementation of the system in accordance with aspects of the present disclosure;

FIG. 4 is a diagrammatical view of an exemplary welding system of the type that might be monitored and analyzed in accordance with the techniques;

FIG. 5 is a diagrammatical representation of certain functional components of the monitoring and analysis system;

FIG. 10 is an exemplary web page view listing historical welds that may be analyzed and presented;

FIG. 17 is an exemplary page for adding or editing an event in accordance with aspects of the present disclosure;

DETAILED DESCRIPTION

Figure 1:
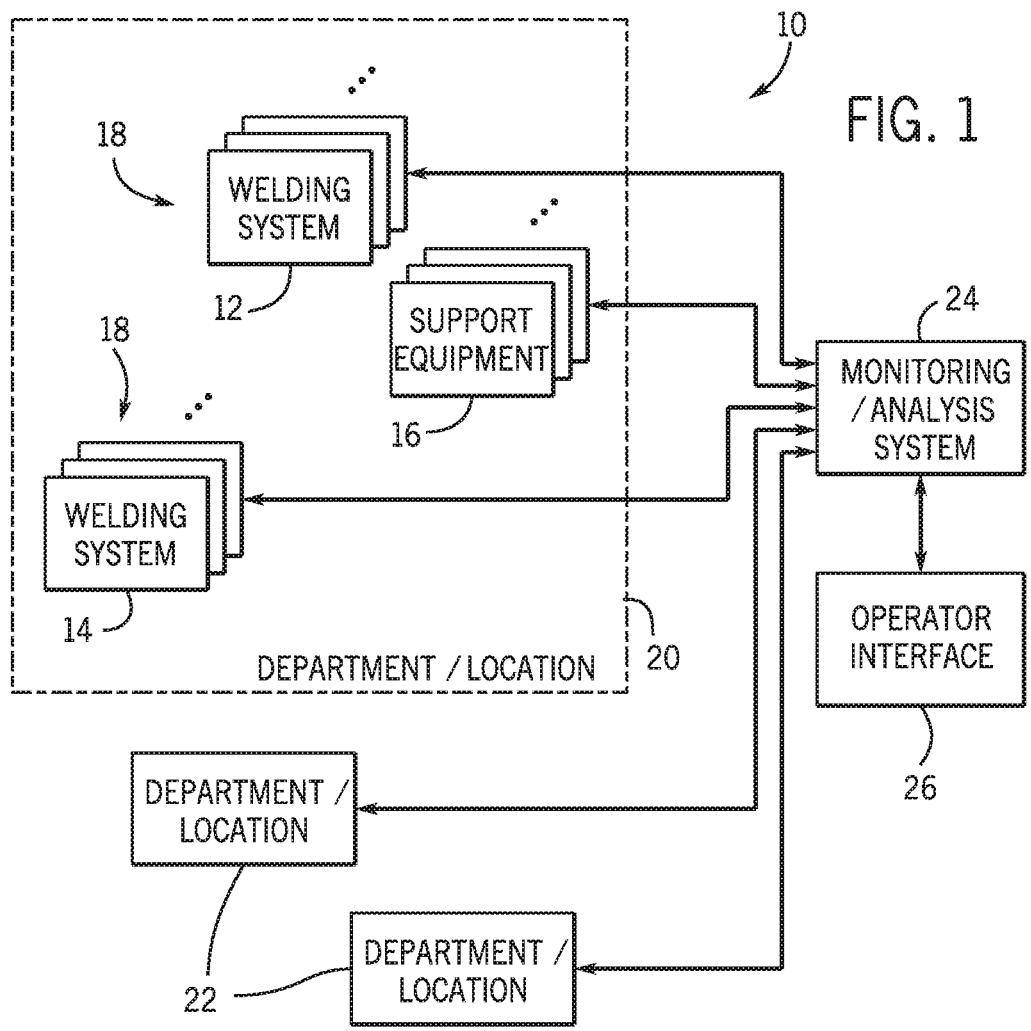
FIG. 1 is a diagrammatical representation of exemplary monitoring system for gathering information, storing information, analyzing the information, and presenting analysis results in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Changes to analyzed manufacturing and/or fabrication system parameters (e.g., changes that exceed a threshold over a set period of time, upward or downward trends, deviation from an average value, deviation from an expected value, variation beyond a set standard deviation value, step changes, etc.) may be due to changes in a manufacturing resource (e.g., a welding system) or the operator (e.g., new automation installed, repair of equipment, parts from a new vendor, new operator, operator training, etc.), which will hereinafter be generally referred to as "events." Changes to the analyzed manufacturing and/or fabrication system parameters may be identified by comparing the system parameters before and after the event, or my comparing system parameters from a first location, facility, shift, operator, etc. in which the event occurred, and a second location, facility, shift, operator, etc. in which the event did not occur. Conventional monitoring systems require operators or managers to remember or otherwise keep track of such changes, and then cross check reports or pages to determine if that change resulted in a decrease or increase in productivity, efficiency, or other specific metrics. By storing events that occur with the collected welding data, rather than requiring a person to remember when specific events occurred or keep track of them in some other way (e.g., a notebook, calendar, spreadsheet, etc.), the monitoring/analysis system 24 described herein (see, e.g., FIG. 1) may present an operator with changes in analyzed system parameters before and after the event, or compare one facility where the event occurred to anther facility where the event did not occur, and in some embodiments correlate changes in analyzed system parameters with logged events. In some embodiments, if there is no logged event around the time of the detected change, the system may bring the change to an operator or manager's attention, and request that the operator or manager enter an event around the time of the change, if one is known.

As illustrated generally in FIG. 1, a monitoring system 10 allows for monitoring and analysis of one or multiple metal fabrication systems, operators, and support equipment. Though the embodiments shown and described with regard to FIGS. 1-19 include metal fabrication systems, it should be understood that the disclosed techniques are not limited to metal fabrication and may be applied to other manufacturing processes. In this view, multiple welding systems 12 and 14 may be interacted with, as may be support equipment 16. The welding systems and support equipment may be physically and/or analytically grouped as indicated generally by reference numeral 18. Such grouping may allow for enhanced data gathering, data analysis, comparison, and so forth. As described in greater detail below, even where groupings are not physical (i.e., the systems are not physically located near one another), highly flexible groupings may be formed at any time through use of the present techniques. In the illustrated embodiment, the equipment is further grouped in a department or location as indicated by reference numeral 20. Other departments and locations may be similarly associated as indicated by reference numeral 22. As will be appreciated by those skilled in the art, in sophisticated manufacturing and fabrication entities, different locations, facilities, factories, plants, and so forth may be situated in various parts of the same country, or internationally. The present techniques allow for collection of system data from all such systems regardless of their location. Moreover, the groupings into such departments, locations, by parts built, by operator, and other equipment sets are highly flexible, regardless of the actual location of the equipment.

In general, as represented in FIG. 1, the system includes a monitoring/analysis system 24 that communicates with the monitoring metal fabrication systems and support equipment, and that can collect information from these when desired. A number of different scenarios may be envisaged for accessing and collecting the information. For example, certain welding systems and support equipment will be provided with sensors, control circuitry, feedback circuits, and so forth that allow for collection of welding parameter data. Some details of such systems are described below. Where system parameters such as arc on time are analyzed, for example, data may be collected in each system reflecting when welding arcs are established and times during which welding arcs are maintained. Currents and voltages will commonly be sensed and data representative of these will be stored. For support equipment, such as grinders, lights, positioners, fixtures, and so forth, different parameters may be monitored, such as currents, switch closures, and so forth. Operators, parts, jobs and so forth may be monitored for presence, identification and so forth. In some embodiments, parameters may include parts produced per unit time, amount of spatter produced, quality metrics, deviation form set quality limits, downstream repair rate, upstream preparation requirements, duration of a part, amount of consumables (e.g., wire contact tips, grinder materials, etc.) consumed, etc.

As noted, many systems will be capable of collecting such data and storing the data within the system itself. In other scenarios, local networks, computer systems, servers, shared memory, and so forth will be provided that can centralize at least at some extent the data collected. Such networks and support components are not illustrated in FIG. 1 for clarity. The monitoring/analysis system 24, then, may collect this information directly from the systems or from any support component that themselves collect and store the data. The data will typically be tagged with such identifying information as system designations, system types, time and date, part and weld specification, where applicable, operator and/or shift identifications, and so forth. Many such parameters may be monitored on a regular basis and maintained in the system. The monitoring/analysis system 24 may itself store such information, or may make use of extraneous memory.

As described more fully below, the system allows for grouping of the information, analysis of the information, and presentation of the information via one or more operator interfaces 26. In many cases, the operator interface may comprise a conventional computer workstation, a handheld device, a tablet computer, or any other suitable interface. It is presently contemplated that a number of different device platforms may be accommodated, and web pages containing useful interfaces, analysis, reports, and the like will be presented in a general purpose interface, such as a browser. It is contemplated that, although different device platforms may use different data transmission and display standards, the system is generally platform-agnostic, allowing reports and summaries of monitored and analyzed data to be requested and presented on any of a variety of devices, such as desktop workstations, laptop computers, tablet computers, hand-held devices and telephones, and so forth. The system may include verification and authentication features, such as by prompting for user names, passwords, and so forth.

Figure 2:
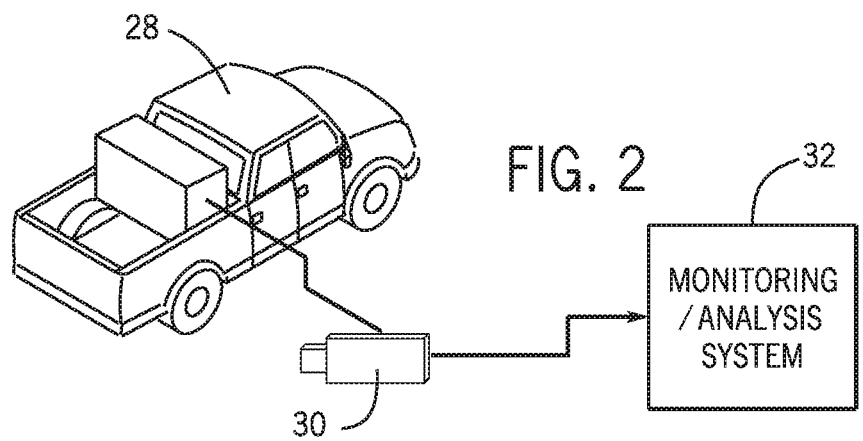
FIG. 2 is a diagrammatical view of an application of the system for a single or mobile welding system in accordance with aspects of the present disclosure.

The system may be designed for a wide range of welding system types, scenarios, applications, and numbers. While FIG. 1 illustrates a scenario that might occur in a large manufacturing or fabrication facility or entity, the system may equally well applied to much smaller applications, and even to individual welders. As shown in FIG. 2, for example, even welders that operate independently and in mobile settings may be accommodated. The application illustrated of FIG. 2 is an engine-driven generator/welder 28 provided in a truck or work vehicle. In these scenarios, it is contemplated that data may be collected by one of several mechanisms. The welder itself may be capable of transmitting the data wirelessly via its own communications circuitry, or may communicate data via a device connected to the welding system, such as communications circuits within the vehicle, a smart phone, a tablet or laptop computers, and so forth. The system could also be tethered to a data collection point when it arrives at a specified location. In the illustration of FIG. 2 a removable memory device 30, such as a flash drive may be provided that can collect the information from the system and move the information into a monitoring/analysis system 32. In smaller applications of this type, the system may be particularly designed for reduced data sets, and analysis that would be more useful to the welding operators and entities involved. It should be apparent to those skilled in the art, then, that the system can be scaled and adapted to any one of a wide range of use cases.

FIG. 3 illustrates an exemplary implementation, for example, which is cloud-based. This implementation is presently contemplated for many scenarios in which data collection, storage, and analysis are performed remotely, such as on a subscription or paid service basis. Here the monitored welding system and support equipment 34 communicate directly and indirectly with one or more cloud data storage and services entities 36. The entities may take any desired form, and significant enhancements in such services are occurring and will continue to occur in coming years. It is contemplated, for example, that a third party provider may contract with a fabricating or manufacturing entity to collect information from the systems, store the information off-site, and perform processing on the information that allows for the analysis and reporting described below. The operator interfaces 26 may be similar to those discussed above, but would typically be addressed to ("hit") a website for the cloud-based service. Following authentication, then, web pages may be served that allow for the desired monitoring, analysis and presentation. The cloud-based services would therefore include components such as communications devices, memory devices, servers, data processing and analysis hardware and software, and so forth.

In some embodiments, the collected data may be entered into one or more databases 37, which may be used to manage the data. The entry of the collected data into the one or more databases and management of the one or more databases 37 would be inefficient for one or more human beings to manage manually, if possible at all. Indeed, the one or more databases 37 for a complex welding system 12, a group 18 of welding systems 14, a department or location 20, or a network of welding systems 12 may be more complex than one or more human beings could manage.

In some cases, each of the one or more databases 37 may consist of multiple tables of information. Examples of individual tables include a product identification table, a weld history record table, a welding system table, a location table, an operator identification table, an events table, etc., or any combination thereof. The product identification table may include the device identification used by the database(s) 37 and a human readable name for each device (e.g., welding system 12). The weld history record table may include high resolution (e.g., data recorded at a rate of 0.1 Hertz to 100,000 hertz) records of parameters such as voltage, current, wire feed speed, and gas flow rate along with a date/time stamp and the device identification to track the source of the information. The welding system table may include parameters such as the welding process, gas type, wire alloy type, wire size, fixture, and operator identification code, etc., or a combination thereof. In some embodiments, the welding system table may also include a date/time stamp and the device identification to track the source of the data. The location table may define a location for each device (e.g., welding system 12). The operator identification table may include human readable terms for the operator identifier used by the database(s) 37. The events table may include data such as location, device (e.g., welding system 12) name, operator name, human readable description of the event, or similar along with a date/time stamp, etc.

As noted above, many different types and configurations of welding systems may be accommodated by the present techniques. Those skilled in the welding arts will readily appreciate that certain such systems have become standards throughout industry. These include, for example, systems commonly referred to as gas metal arc welding (GMAW), gas tungsten arc welding (GTAW), shielded metal arc welding (SMAW), submerged arc welding (SAW), laser, plasma cutting, plasma welding, and stud welding systems to mention only a few. All such systems rely on application of energy to workpieces and electrodes to at least partially melt and fuse metals. The systems may be used with or without filler metal, but most systems common in industry do use some form of filler metal, which is either machine or hand fed. Moreover, certain systems may be used with other materials than metals, and these systems, too, are intended to be serviced where appropriate by the present techniques.

By way of example only, FIG. 4 illustrates an exemplary welding system 12, in this case a MIG welding system. In the illustrated embodiment the system include a power supply that receives incoming power, such as from a generator or the power grid and converts the incoming power to weld power. In other embodiments, the system 12 may be an entire weld cell, or some other piece of manufacturing equipment. Power conversion circuitry 38 allows for such conversion, and will typically include power electronic devices that are controlled to provide altering current (AC), direct current, pulsed or other waveforms as defined by welding processes and procedures. The power conversion circuitry will typically be controlled by control and processing circuitry 40. Such circuitry will be supported by memory (not separately shown) that stores welding process definitions, operator-set parameters, and so forth. In a typical system, such parameters may be set via an operator interface 42. The systems will include some type of data or network interface as indicated at reference numeral 44. In many such systems this circuitry will be included in the power supply, although it could be located in a separate device. The system allows for performing welding operations, collecting both control and actual data (e.g., feedback of voltages, currents, wire feed speeds, etc.). Where desired, certain of this data may be stored in a removable memory 46. In many systems, however, the information will be stored in the same memory devices that support the control and processing circuitry 40.

In the case of a MIG system, a separate wire feeder 48 may be provided. The components of the wire feeder are illustrated here in dashed lines because some systems may optionally use wire feeders. The illustrated system, again, is intended only to be exemplary. Such wire feeders, where utilized typically include a spool of welding wire electrode wire 50 and a drive mechanism 52 that contacts and drives the wire under the control of a drive control circuitry 54. The drive control circuitry may be set to provide a desired wire feed speed in a conventional manner. In a typical MIG system a gas valve 56 will allow for control of the flow of the shield and gas. Setting on the wire feeder may be made via an operator interface 58. The welding wire, gas, and power is provided by a weld cable as indicated diagrammatically at reference numeral 60, and a return cable (sometimes referred to as a ground cable) 62. The return cable is commonly coupled to a workpiece via a clamp and the power, wire, and gas supplied via the weld cable to a welding torch 64.

Here again, it should be noted that the system of FIG. 4 is exemplary only, the present techniques allow for monitoring and analysis of performance of these types of cutting, heating, and welding systems, as well as others. Indeed, the same monitoring analysis system may collect data from different types, makes, sizes, and versions of metal fabrication systems. The data collected and analyzed may relate to different processes and weld procedures on the same or different systems. Moreover, as discussed above, data may be collected from support equipment used in, around or with the metal fabrication systems.

FIG. 5 illustrates certain functional components that may typically be found in the monitoring/analysis system. In the notation used in FIG. 5, these components will be located in a cloud-based service entity, although similar components may be included in any one of the implementations of the system. The components may include, for example, data collection components 68 that receive data from systems and entities. The data collection components may "pull" the data by prompting data exchange with the systems, or may work on a "push" basis where data is provided to the data collection components by the systems without prompting (e.g., at the initiation of the welding system, network device, or management system to which the equipment is connected). The data collection may occur at any desired frequency, or at points in time that are not cyclic. For example, data may be collected on an occasional basis as welding operations are performed, or data may be provided periodically, such as on a shift basis, a daily basis, a weekly basis, or simple as desired by a welding operator or facilities management team. The systems will also include memory 70 that store raw and/or processed data collected from the systems. Analysis/reporting components 72 allow for processing of the raw data, and associating the resulting analysis with systems, entities, groups, welding operators, and so forth. Examples of the analysis and reporting component operations are provided in greater detail below. Finally, communications components 74 allow for populating reports and interface pages with the results of the analysis. A wide range of such pages may be provided as indicated by reference numeral 76 in FIG. 5, some of which are described in detail below. The communications components 74 may thus include various servers, modems, Internet interfaces, web page definitions, and the like.

As noted above, the present techniques allow for a wide range of data to be collected from welding systems and support equipment for setup, configuration, storage, analysis, tracking, monitoring, comparison and so forth. In the presently contemplated embodiments this information is summarized in a series of interface pages that may be configured as web pages that can be provided to and viewed on a general purpose browser. In practice, however, any suitable interface may be used. The use of general purpose browsers and similar interfaces, however, allows for the data to be served to any range of device platforms and different types of devices, including stationary workstations, enterprise systems, but also mobile and handheld devices as mentioned above. FIGS. 6-18 illustrate exemplary interface pages that may be provided for a range of uses.

Figure 6:
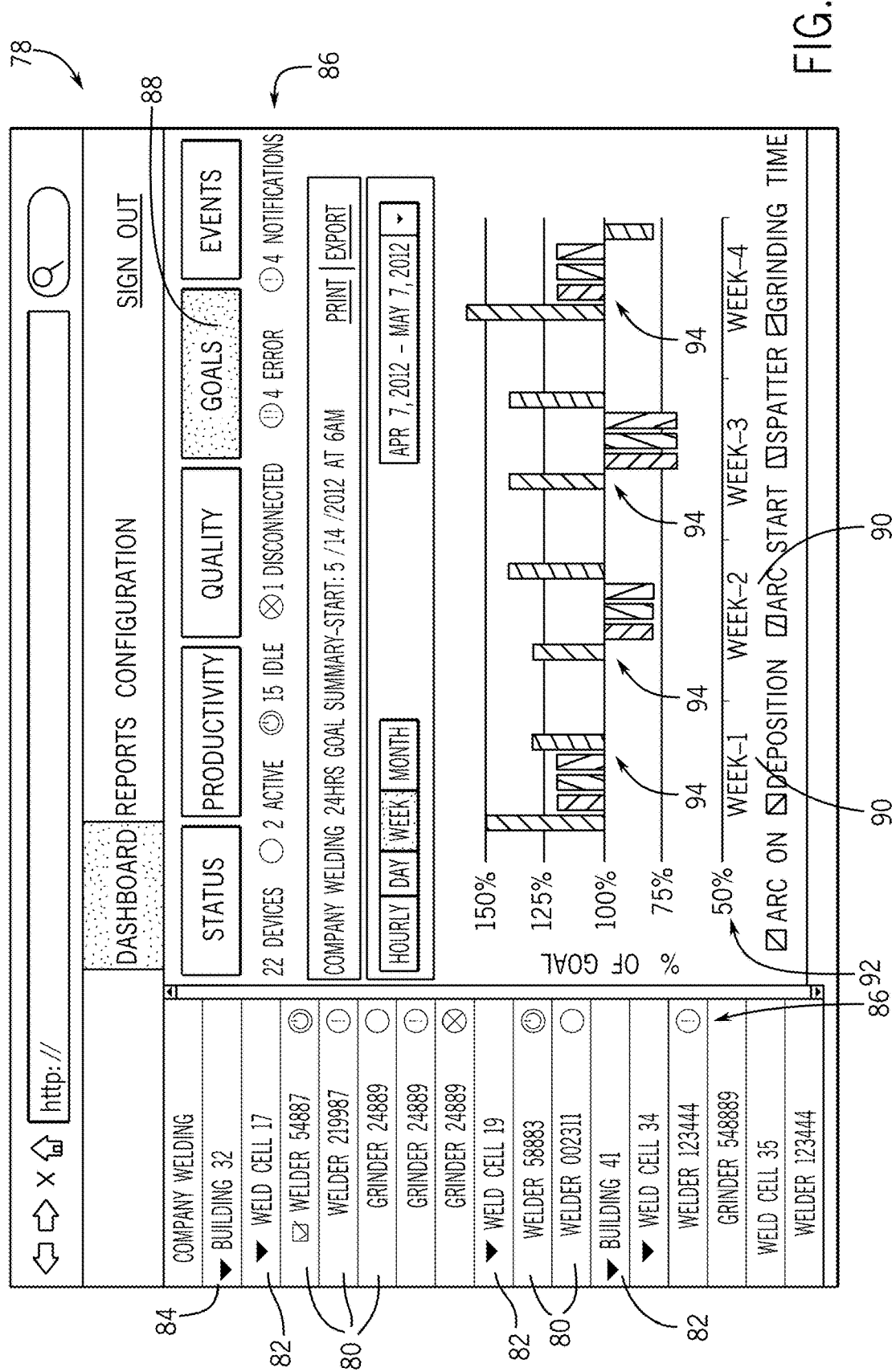
FIG. 6 is an exemplary web page view for reporting of a goals and performance of welding systems via the system.

Referring first to FIG. 6, a goal report page 78 is illustrated. This page allows for the display of one or more welding system and support equipment designations as well as performance analysis based upon goals set for the systems. In the page illustrated in FIG. 6, a number of welding systems and support equipment are identified as indicated at reference numeral 80. These may be associated in groups as indicated by reference numeral 82. In practice, the data underlying all of the analyses discussed in the present disclosure are associated with individual systems. These may be freely associated with one another, then, by the interface tools. In the illustrated example, a location or department 84 has been created with several groups designated within the location. Each of these groups, then, may include one or more welding systems and any other equipment as shown in the figure. The present embodiment allows for free association of these systems so that useful analysis of individual systems, groups of systems, locations, and so forth may be performed. The systems and support equipment may be in a single physical proximity, but this need not be the case. Groups may be created for example, based on system type, work schedules, operators, parts built, production and products, and so forth. In systems where operators provide personal identification information, this information may be tracked in addition to or instead of system information.

In the illustrated embodiment status indicators are illustrated for conveying the current operational status of the monitored systems and equipment. These indicators, as designated by reference numeral 86, may indicate, for example, active systems, idle systems, disconnected systems, errors, notifications, and so forth. Where system status can be monitored on a real-time or near real-time basis, such indicators may provide useful feedback to management personnel on the current status of the equipment. The particular information illustrated in FIG. 6 is obtained, in the present implementation, by selecting (e.g., clicking on) a goals tab 88. The information presented may be associated in useful time slots or durations, such as successive weeks of use as indicated by reference numeral 90. Any suitable time period may utilized, such as hourly, daily, weekly, monthly, shift-based designations, and so forth.

The page 78 also presents the results of analysis of each of a range of performance criteria based upon goals set for the system or systems selected. In the illustrated example a welding system has been selected as indicated by the check mark in the equipment tree on the left, and performance on the basis of several criteria is presented in bar chart form. In this example, a number of monitored criteria are indicated, such as arc on time, deposition, arc starts, spatter, and grinding time. A goal has been set for the particular system as discussed below, and the performance of the system as compared to this goal is indicated by the bars 92 for each monitored parameter. It should be noted that certain of the parameters may be positive in convention while others may be negative. That is, by way of example, for arc on times, representing the portion of the working time in which a welding arc is established and maintained, a percentage of goal exceeding the set standard may be beneficial or desirable. For other parameters, such as spatter, exceeding a goal may actually be detrimental to work quality. As discussed below, the present implementation allows for designation of whether the analysis and presentation may consider these conventionally positive or conventionally negative. The resulting presentations 94 allow for readily visualizing the actual performance as compared to the pre-established goals.

Figure 7:
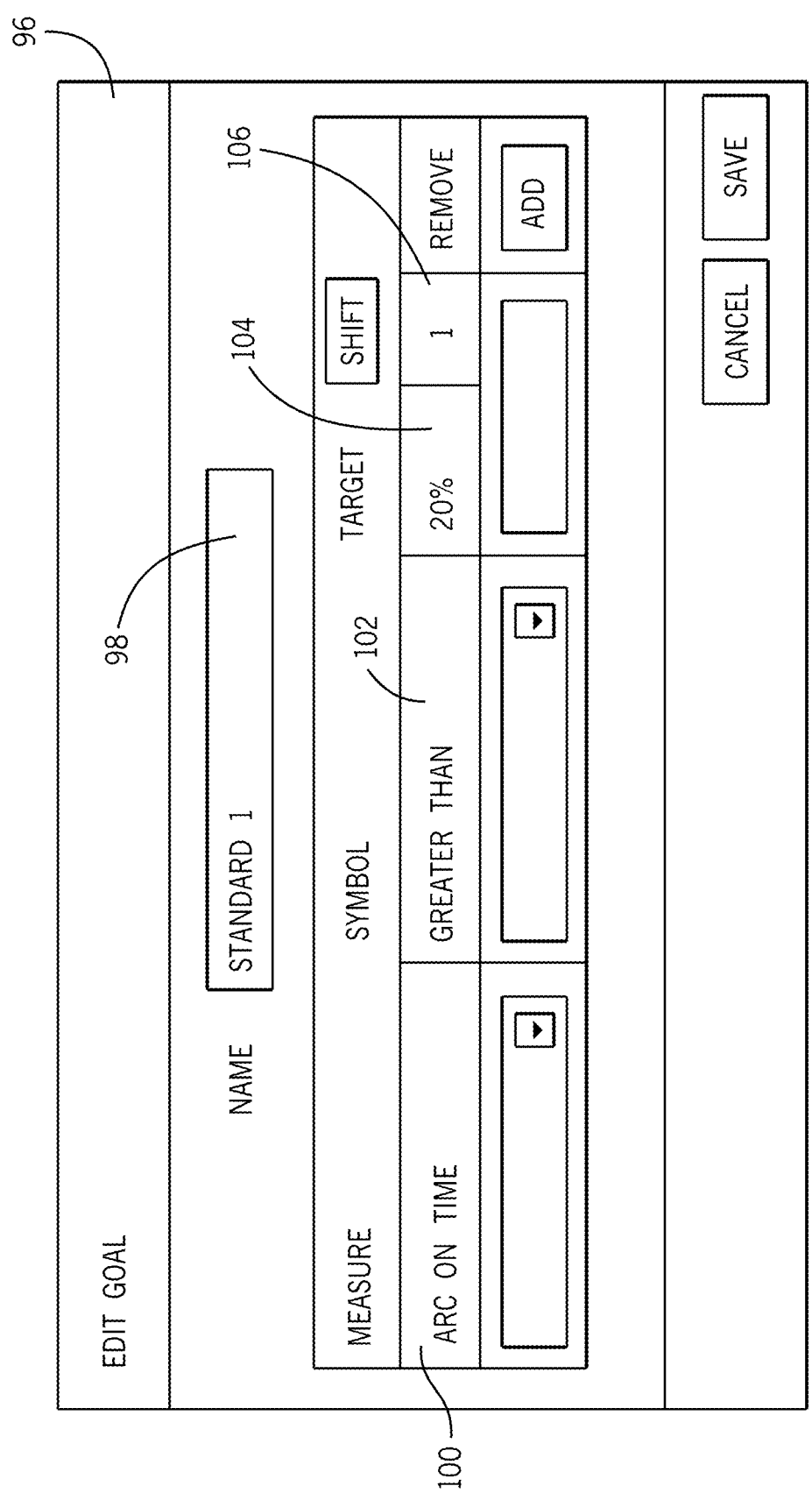
FIG. 7 is another exemplary web page view illustrating an interface for setting such goals.

FIG. 7 illustrates an exemplary goal editing page 96. Certain fields may be provided that allow for setting of standard or commonly used goals, or specific goals for specific purposes. For example, a name of the goal may be designated in a field 98. The other information pertaining to this name may be stored for use in analyzing the same or different systems. As indicated by reference numeral 100, the illustrated page allows for setting a standard for the goal, such as arc on time. Other standards and parameters may be specified so long as data may be collected that either directly or indirectly indicates the desired standard (i.e., allows for establishment of a value for comparison and presentation). A convention for the goal may be set as indicated at reference numeral 102. That is, as discussed above, certain goals it may be desired or beneficial that the established goal define a maximum value targeted, while other goals may establish a minimum value targeted. A target 104 may then be established, such as on a numerical percentage basis, an objective (e.g., unit) basis, relative basis, or any other useful basis. Further fields, such as a shift field 106 may be provided. Still further, in some implementations it may be useful to begin goal or standard setting with an exemplary weld known to have been done and possess characteristics that are acceptable. Goals may then be set with this as a standard, or with one or more parameters set based on this weld (e.g., +/−20%).

Figure 8:
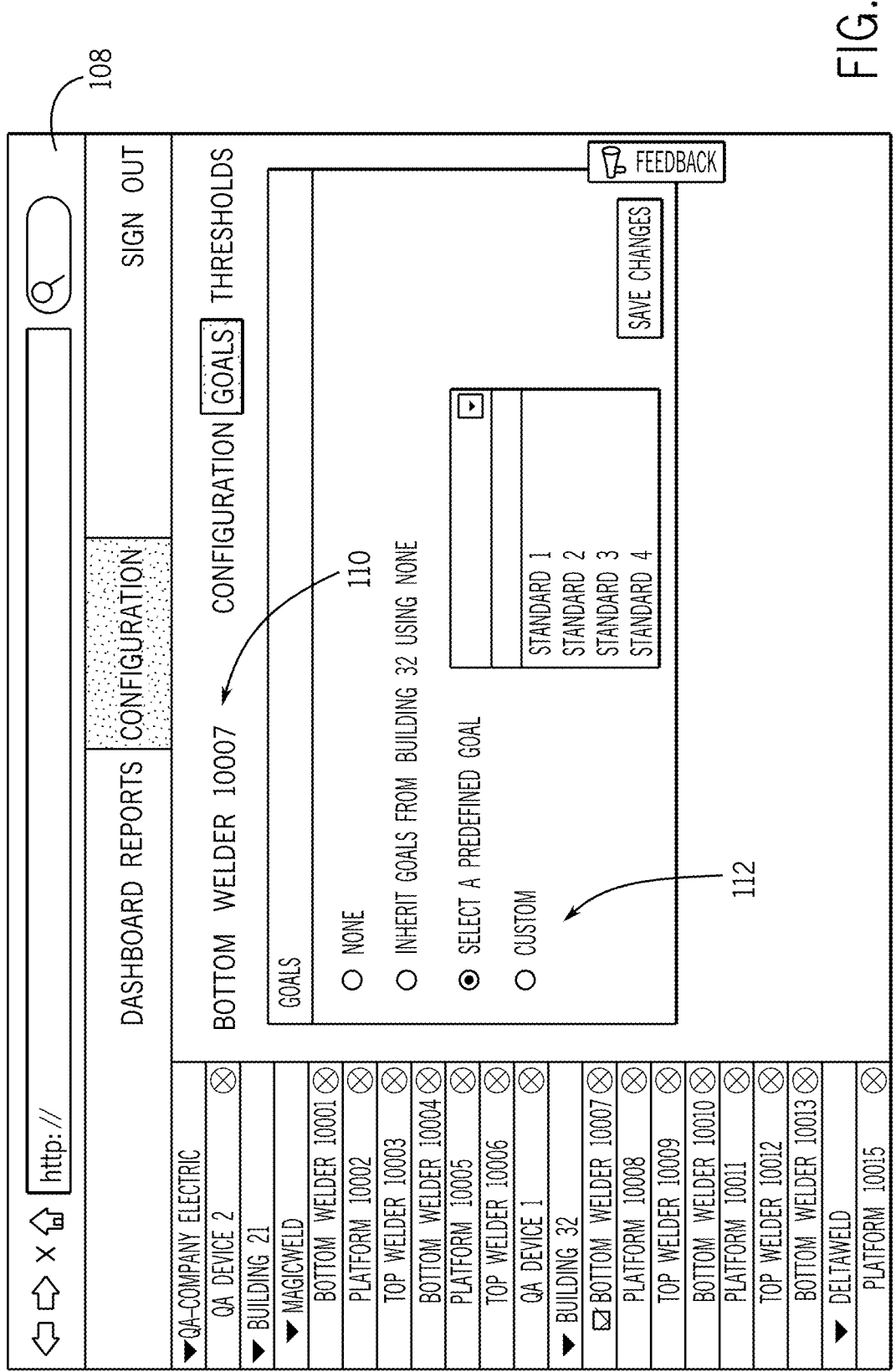
FIG. 8 is a further exemplary web page view of a goal setting interface.

FIG. 8 illustrates a goal setting page 108 that may take established goals set by pages such as that illustrated in FIG. 7 and apply them to specific equipment. In the page 108 of FIG. 8, a welding system designated "bottom welder" has been selected as indicated by the check mark to the left. The system identification 110 appears in the page. A menu of goals or standards is then displayed as indicated by reference numeral 112. In this example, selections include placing no goal on the equipment, inheriting certain goals set for a particular location (or other logical grouping), selecting a predefined goal (such as a goal established by a page such as thus shown in FIG. 7), and establishing a custom goal for the equipment.

Figure 9:
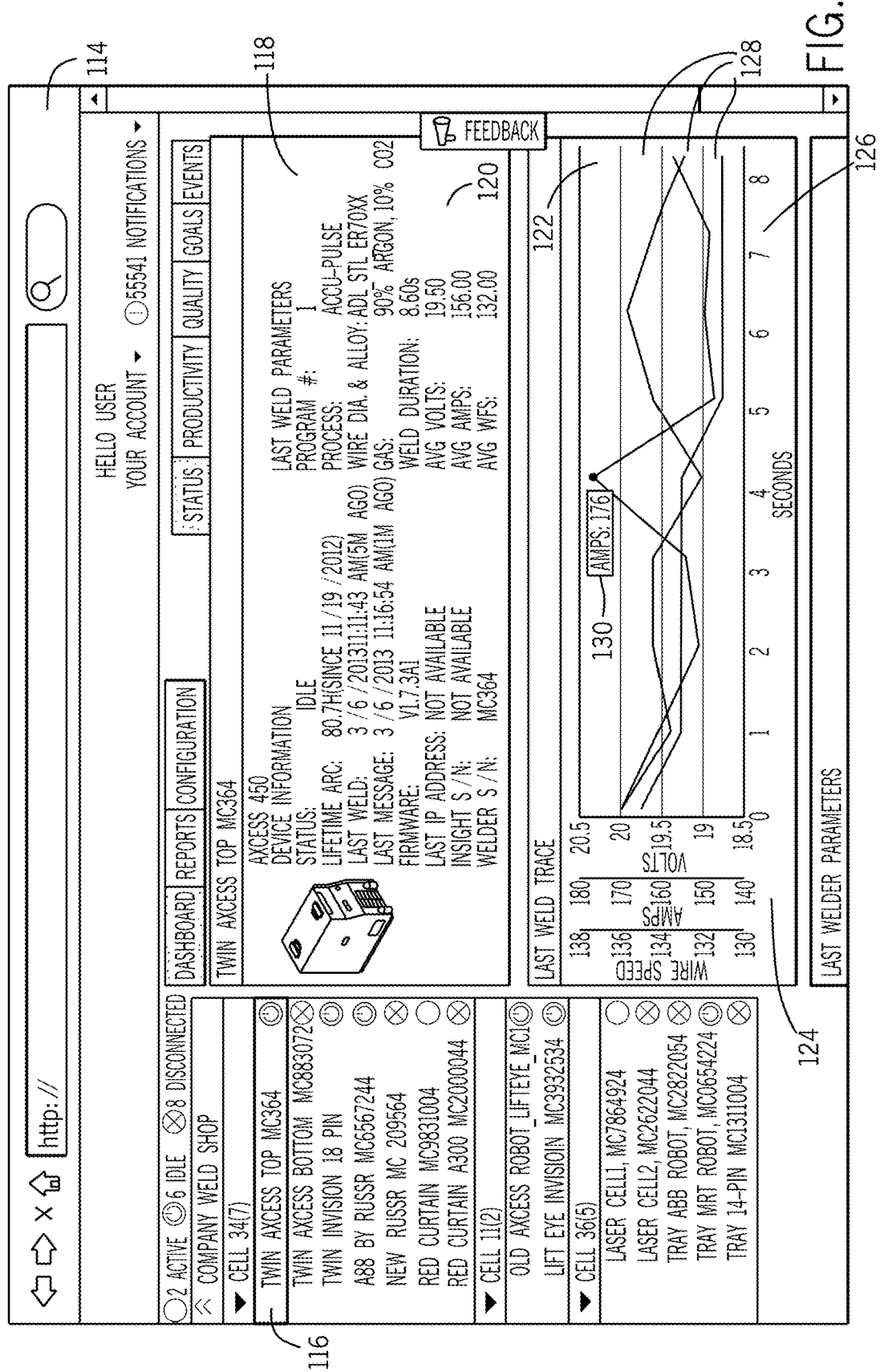
FIG. 9 is an exemplary web page view of an interface for tracing parameters of a particular weld or system.

The present techniques also allow for storing and analyzing certain performance parameters of systems in tracking or trace views. These views can be extremely informative in terms of specific welds, performance over certain periods of time, performance by particular operators, performance on particular jobs or parts, and so forth. An exemplary weld trace page 114 is illustrated in FIG. 9. As indicated on this page, a range of equipment may be selected as indicated on the left of the page, with one particular system being currently selected as indicated by reference numeral 116. Once selected, in this implementation a range of data relating to this particular system is displayed as indicated by reference numeral 118. This information may be drawn from the system or from archived data for the system, such as within an organization, within a cloud resource, and so forth. Certain statistical data may be aggregated and displayed as indicated at reference numeral 120.

The weld trace page also includes a graphical presentation of traces of certain monitor parameters that may be of particular interest. The weld trace section 122, in this example, shows several parameters 124 graphed as a function of time along a horizontal axis 126. In this particular example, the parameters include wire feed speed, current, and volts. The weld for which the cases are illustrated in the example had duration of approximately 8 seconds. During this time the monitored parameters changed, and data reflective of these parameters was sampled and stored. The individual traces 128 for each parameter are then generated and presented to the user. Further, in this example by a "mouse over" or other input the system may display the particular value for one or more parameters at a specific point in time as indicated by reference numeral 130.

Figure 10:
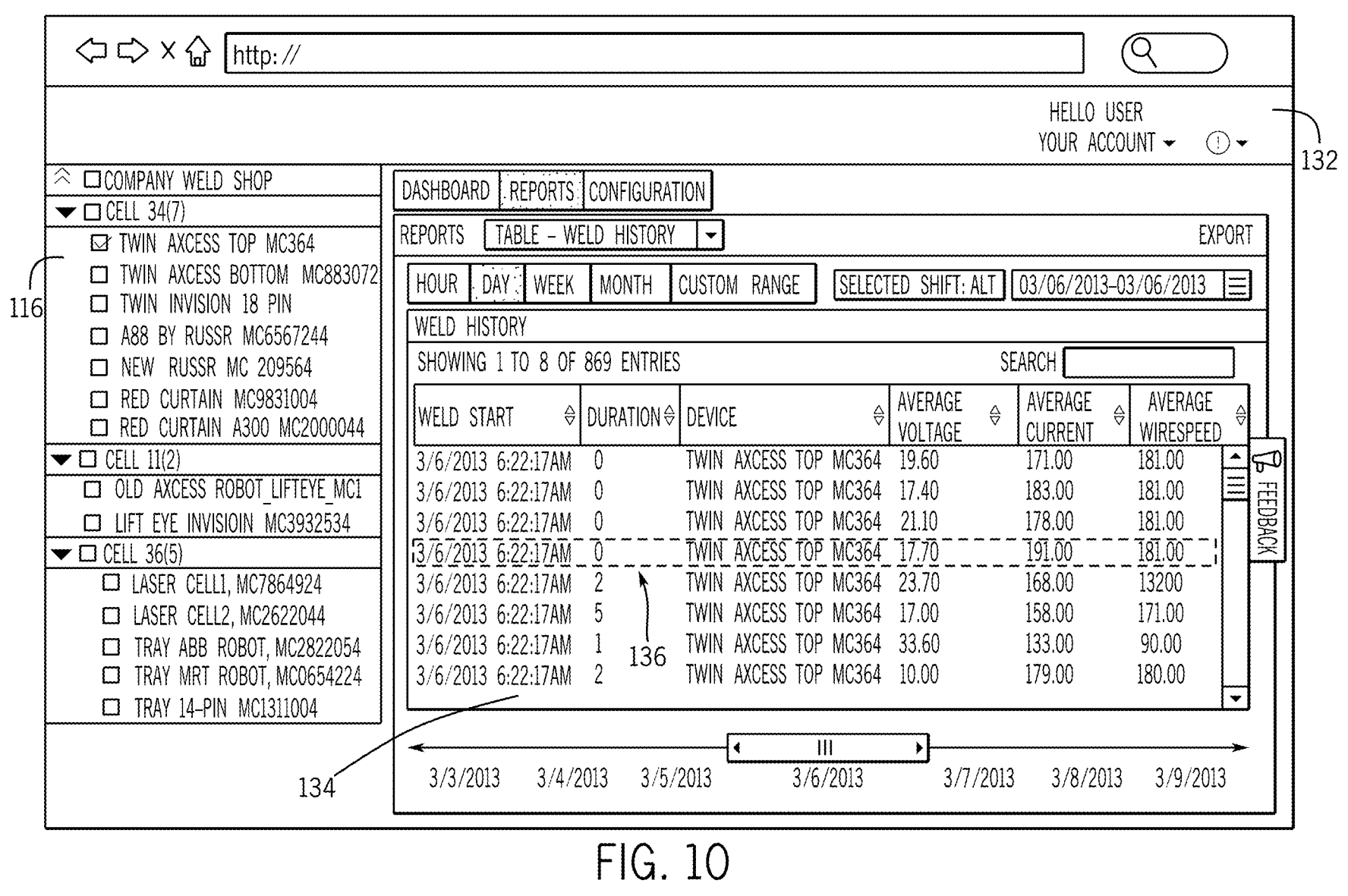

The trace pages may be populated, as may any of the pages discussed in the present disclosure, in advance or upon demand by a user. This being the case, the trace pages for any number of systems, and specific welds may be stored for later analysis and presentation. A history page 132 may thus be compiled, such as illustrated in FIG. 10. In the history page illustrated, a list of welds performed on a selected system 116 (or combination of selected systems) is presented as indicated by reference numeral 134. These welds may be identified by times, system, duration, weld parameters, and so forth. Moreover, such lists may be compiled for specific operators, specific products and articles of manufacture, and so forth. In the illustrated embodiment, a particular weld has been selected by the user as indicated at reference numeral 136.

Figure 11:
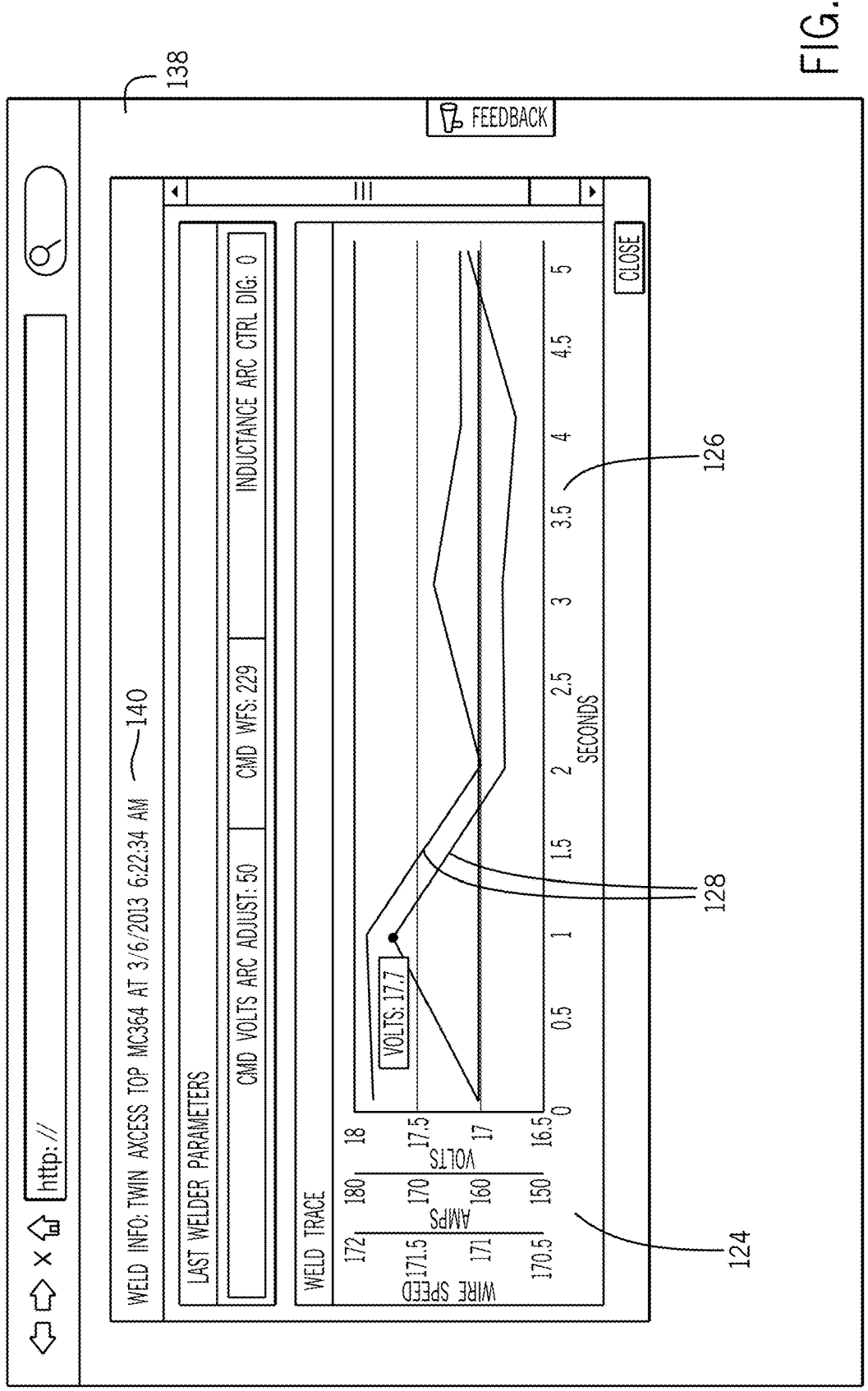
FIG. 11 is an exemplary web page view of historical traces available via the system.

FIG. 11 illustrates an historical trace page 138 that may be displayed following selection of the particular weld 136. In this view, an identification of the system, along with the time and date, are provided as indicated by reference numeral 140. Here again, monitored parameters are identified as indicated by reference numeral 124, and a time axis 126 is provided along which traces 128 are displayed. As will be appreciated by those skilled in the art, the ability to store and compile such analyses may be significantly useful in evaluating system performance, operator performance, performance on particular parts, performance of departments and facilities, and so forth.

Figure 12:
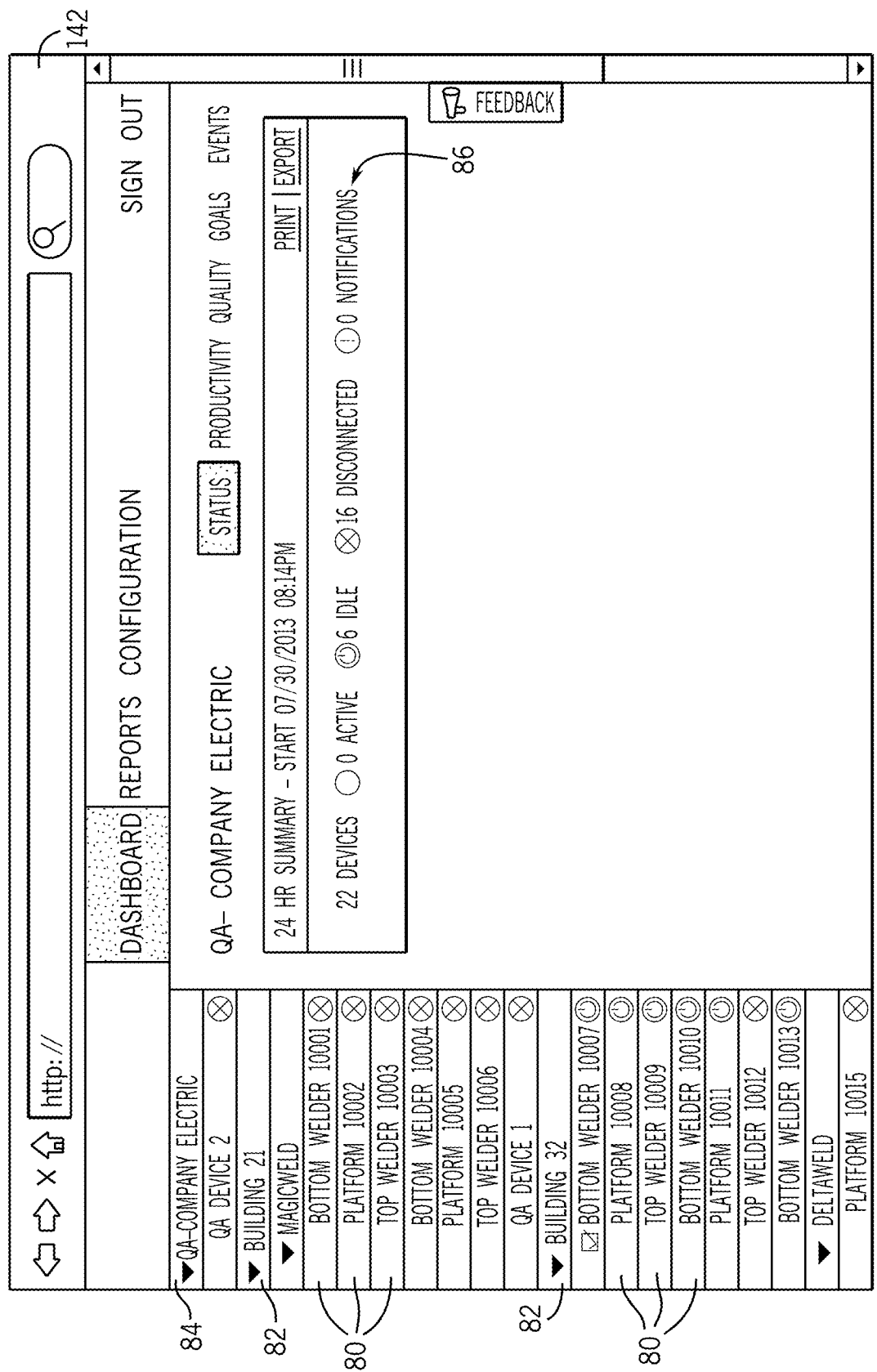
FIG. 12 is an exemplary web page view of a status interface allowing for selection of systems and groups of systems for comparison.
Figure 13:
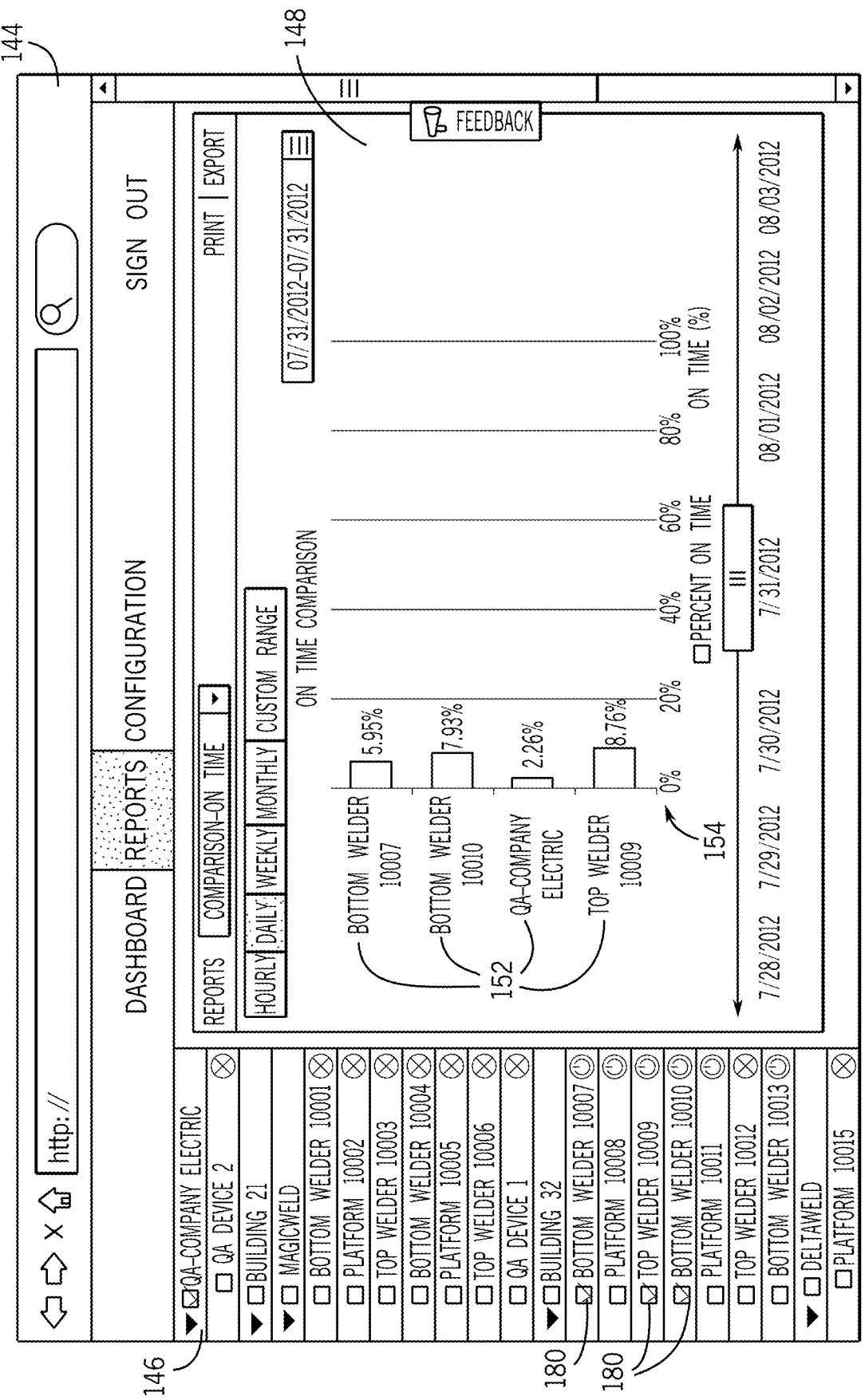
FIG. 13 is an exemplary web page view of a comparison of systems and groups of systems selected via the interface of FIG. 12.

Still further, the present techniques allow for comparisons between equipment on a wide range of bases. Indeed, systems may be compared, and presentations resulting from the comparison may be provided any suitable parameter that may form the basis for such comparisons. An exemplary comparison selection page 142 is illustrated in FIG. 12. As shown in this page, multiple systems 80 are again grouped into groups 82 for a facilities or locations 84. Status indicators 86 may be provided for the individual systems or groups. The status page illustrated in FIG. 12 may then serve as the basis for selecting systems for comparison as illustrated in FIG. 13. Here, the same systems and groups are available for selection and comparison. The comparison page 144 displays these systems and allows users to click or select individual systems, groups, or any sub-group that is created at will. That is, while an entire group of systems may be selected, the user may select individual systems or individual groups as indicated by reference numeral 146. A comparison section 148 is provided in which a time base for a comparison may be selected, such as on an hourly, daily, weekly, monthly, or any other range. Once selected, then, desired parameters are compared for the individual systems, with the systems being identified as indicated at reference numeral 152, and the comparisons being made and in this case graphically displayed as indicated by reference numeral 154. In the illustrated example, for example, system on time has been selected as a basis for the comparison. Data for each individual system reflective of the respective on time of the system has been analyzed and presented in a percentage basis by a horizontal bar. Other comparisons may be made directly between the systems, such as to indicate that one system has outperformed another on the basis of the selected parameter. More than one parameter could be selected in certain embodiments, and these may be based on raw, processed or calculated values.

The monitoring/analysis system 24 processes acquired data from one or more groups 18 of welding systems 12 and support equipment 16. As discussed above, the acquired data includes, but is not limited to, currents, voltages, systems activation time, arc starts, arc duration, wire feed rate, switch closures, and so forth. The monitoring/analysis system 24 presents this acquired data to the operator via the operator interface 26. The acquired data may be compared to goals stored in the memory 70. In addition to processing and presenting the acquired data and stored goals via the operator interface 26, presently contemplated embodiments of the monitoring/analysis system 24 analyze the acquired data and present analyzed system parameters, such as arc on time percentage (e.g., arc on %) and deposition (e.g., deposition quantity, deposition rate). The analyzed system parameters produced by the monitoring/analysis system 24 are calculated values that facilitate comparisons between welding systems 12 or groups 82 of welding systems 12, comparisons between operators and shifts, and/or comparisons between departments/locations 20. In some embodiments, the monitoring/analysis system 24 may automatically present one or more analyzed system parameters on a page 76 (e.g., start-up screen or "dashboard") without user instructions to do so, thereby enabling an operator to evaluate performance upon viewing the page 76 without additional inputs to the operator interface 26. Automatic determination of the analyzed system parameters eliminates a step by the user to perform calculations separately, such as with a calculator, mentally, or by hand. Accordingly, the user may evaluate the performance more quickly than if the analyzed system parameters were not automatically determined and presented.

The analyzed system parameters may include arc on time percentage (e.g., arc on %) and deposition. The arc on % for one or more welding systems 12 during a time period (e.g., day, shift, week, month) may be determined from Equation (1):

$$\text{Arc On \%} = T_{arc\ on}/T_{work} \quad \text{Equation (1)}$$

where $T_{work}$ is the cumulative working time that the one or more welding systems 12 are powered on (e.g., ready to supply an arc to a torch) during the time period, and $T_{arc\ on}$ is the cumulative time that the one or more welding systems 12 have an active arc during the time period. The arc on % value may be useful as a metric to evaluate and compare welding experience of a first group of one or more welding operators to a second group of one or more welding operators. For example, the arc on % for an experienced welder performing a first weld with a first welding system 12 may be greater than the arc on % for a less experienced welder for the first weld with the first welding system 12. In some embodiments, the arc on % value may be used to evaluate and compare the welding proficiency of one or more welding operators using one or more welding systems 12 during a first time period to the same one or more operators using the same one or more welding systems 12 during a second time period. The arc on % value may also be useful as a metric to evaluate and compare the efficiency and/or productivity of the first group to a second group, or the first group to itself between a first time period and a second time period. For example, a drop in arc on % from a first time period to the second time period may indicate the occurrence of an event (e.g., increased complexity, welder distraction, welding error) during the time period for a system administrator or manager to investigate. The monitoring/analysis system 24 may present on a user viewable page 76 comparisons of arc on % value between the first group and the second group and/or comparisons of arc on % value between a first group during a first time period and the first group during a second time period (e.g., before and after an event, such as new equipment, equipment repair, completion of a training course, equipment maintenance, institution of new processes/procedures, and the like). In some embodiments, the arc on % value may be useful as a metric to evaluate multiple welding systems 12 by comparing the arc on % between a first group of welding systems 12 and a second group of welding systems 12 where both are utilized by the same operators.

The deposition for a welding system 12 during a time period may be determined from Equation (2):

$$\text{Deposition(quantity)} = WFS * d * T_{arc\ on} \quad \text{Equation (2)}$$

where WFS is the wire feed speed (e.g., inches per minute), d is the wire density (e.g., pounds per inch), and $T_{arc\ on}$ is the cumulative time (e.g., minutes) that the welding system 12 has an active arc during the time period. The WFS, wire density, and/or wire diameter may be entered by a user. In some embodiments, the welding system 12 determines the WFS based on weld parameters (e.g., current, voltage, materials). Additionally or in the alternative, some embodiments of the welding system 12 may determine the wire diameter. The WFS and d may vary based at least in part on the characteristics (e.g., materials, width, wire diameter, solid or cored wire construction) of the welding wire. The monitoring/analysis system 24 may determine the deposition value as the total amount (e.g., weight) of wire deposited during a time period or per part or per operator or a rate of deposition per minute or per hour during $T_{work}$. The deposition rate may be determined by dividing the deposition quantity from Equation (2) by the cumulative working time that the welding system 12 is powered on ($T_{work}$).

Figure 14:
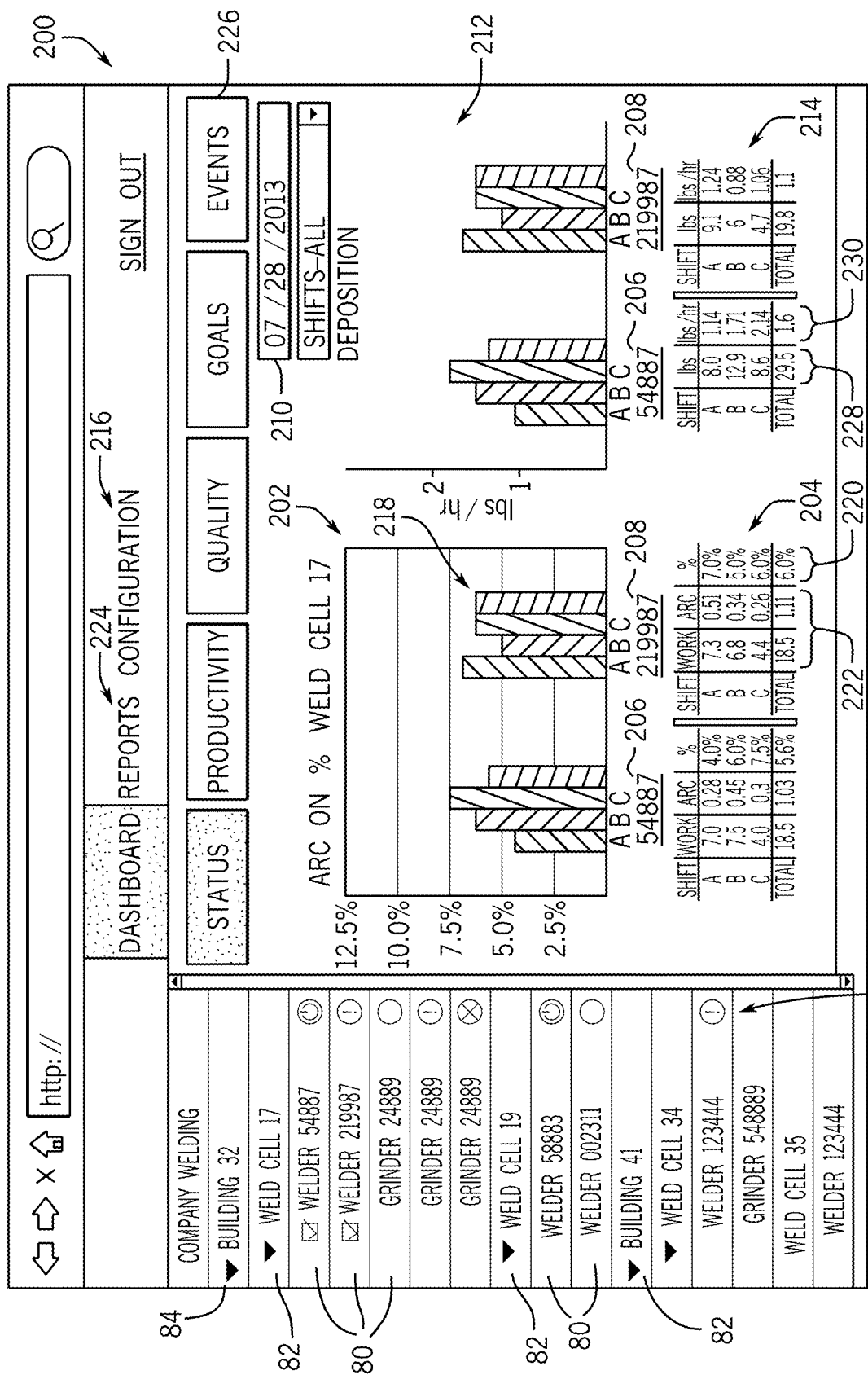
FIG. 14 is an exemplary web page view of a dashboard page of analyzed system parameters determined by the system.

FIG. 14 illustrates an embodiment of a dashboard page 200 presenting the arc on % and deposition as analyzed system parameters. The dashboard page 200 may be a page 76 presented to the user upon initiating a session with the monitoring/analysis system 24 via the operator interface 26. In some embodiments, an operator may configure the dashboard page 200 to present the analyzed system parameters for one or more welding systems 80 utilized by one or more operators (e.g., shifts). For example, the dashboard page 200 of FIG. 14 presents the analyzed system parameters of arc on time percentage and deposition for two selected welding systems 80 utilized over several shifts in a time period 210. The operator may configure the dashboard page 200 to present analyzed system parameters in various graphs, tables, lists, and so forth arranged at various customizable locations about the dashboard page 200. The analyzed system parameters may be presented for comparison and evaluation of one or more welding systems 80 over one or more time periods 210. More complete descriptions of such arrangements of analyzed system parameters about the dashboard page 200 is provided, for example, in U.S. application no. 2009/0313549, entitled Configurable Welding Interface for Automated Welding Applications, filed by Casner et al. on Jun. 16, 2008.

An arc on percentage graph 202 and/or an arc on percentage table 204 present the arc on % for a first welding system 206 and a second welding system 208 for multiple shifts during the time period 210, which may be a particular day, week, month, etc. A deposition graph 212 and/or a deposition table 214 present the deposition for the first welding system 206 and the second welding system 208 for multiple shifts during the time period 210. In some embodiments, the dashboard page 200 may present various combinations of the arc on percentage graph 202, the arc on percentage table 204, the deposition graph 212, the deposition table 214, and other representations of analyzed system parameters. The operator may configure the arrangement and composition of the dashboard page 200 via the configuration tab 216.

The arc on percentage graph 202 presents graphical representations 218 for the arc on % for each selected shift (e.g., shift A, shift B, shift C) utilizing the first welding system 206 and the second welding system 208 during the time period 210 or time range. The arc on percentage graph 202 may also present a value for the total arc on % for the time period 210 over the selected shifts. The arc on percentage graph 202 enables a viewer of the dashboard page 200 to readily compare the arc on % values for each respective shift and respective machine to identify issues for further review. The arc on percentage table 204 presents numerical values 220 for the arc on time percentage for each selected shift utilizing at least the first and second welding systems 206, 208 during the time period 210. In some embodiments, the arc on percentage table 204 presents acquired data 222 utilized to generate the analyzed system parameter 220. The arc on time percentage 220 and acquired data 222 presented together may provide the user viewing the dashboard page 200 a more complete review of a status of the first and second welding systems 206, 208 during the time period 210 than either the arc on time percentage 220 or the acquired data 222 alone. For example, the dashboard page 200 illustrates an embodiment in which the arc on % value for shift A utilizing the first welding system 206 is less than the arc on % value for shifts B and C. Upon noticing the difference, the viewer may investigate a cause by reviewing the acquired data 222, one or more reports (e.g., via a reports tab 224), and/or a list of events (e.g., via events page 226).

The deposition graph 212 may present a quantity of a welding wire deposited and/or a deposition rate for the selected first and second welding machines 206, 208 during the time period 210. The deposition graph 212 of the deposition rate for the first and second welding systems 206, 208 may have similar shapes. For example, the deposition graph 212 may have approximately the same shape as the arc on % graph 202 where the wire diameter and the density per unit length of the wire for each welding machine scale the deposition graph 212 relative to the arc on % graph 202. As shown in the deposition table 214, the first welding system 206 may deposit a greater quantity (e.g., approximately 50%) of welding wire during the time period 210 than the second welding system 208 despite that the first and the second welding systems 206, 208 have substantially the same arc on % values over the time period 210. The scale difference in the deposition graph 212 may be based at least in part on a difference in the wire diameter and density per unit length of the welding wire (e.g., welding wire diameter of first welding system 206 is greater than welding wire diameter of second welding system 208) and/or a difference in the WFS between the welding systems (e.g., WFS of the first welding system 206 is greater than the WFS of the second welding system 208). The deposition table 214 presents the deposition quantity 228 (e.g., lb) and deposition rate 230 (e.g., lbs/hr) for each shift of the first and the second welding system 206, 208 during the time period 210. The deposition table 214 may present the total deposition quantity 228 for the time period 210 from the shifts, and/or may present the average deposition rate for each welding system over the time period 210.

Figure 15:
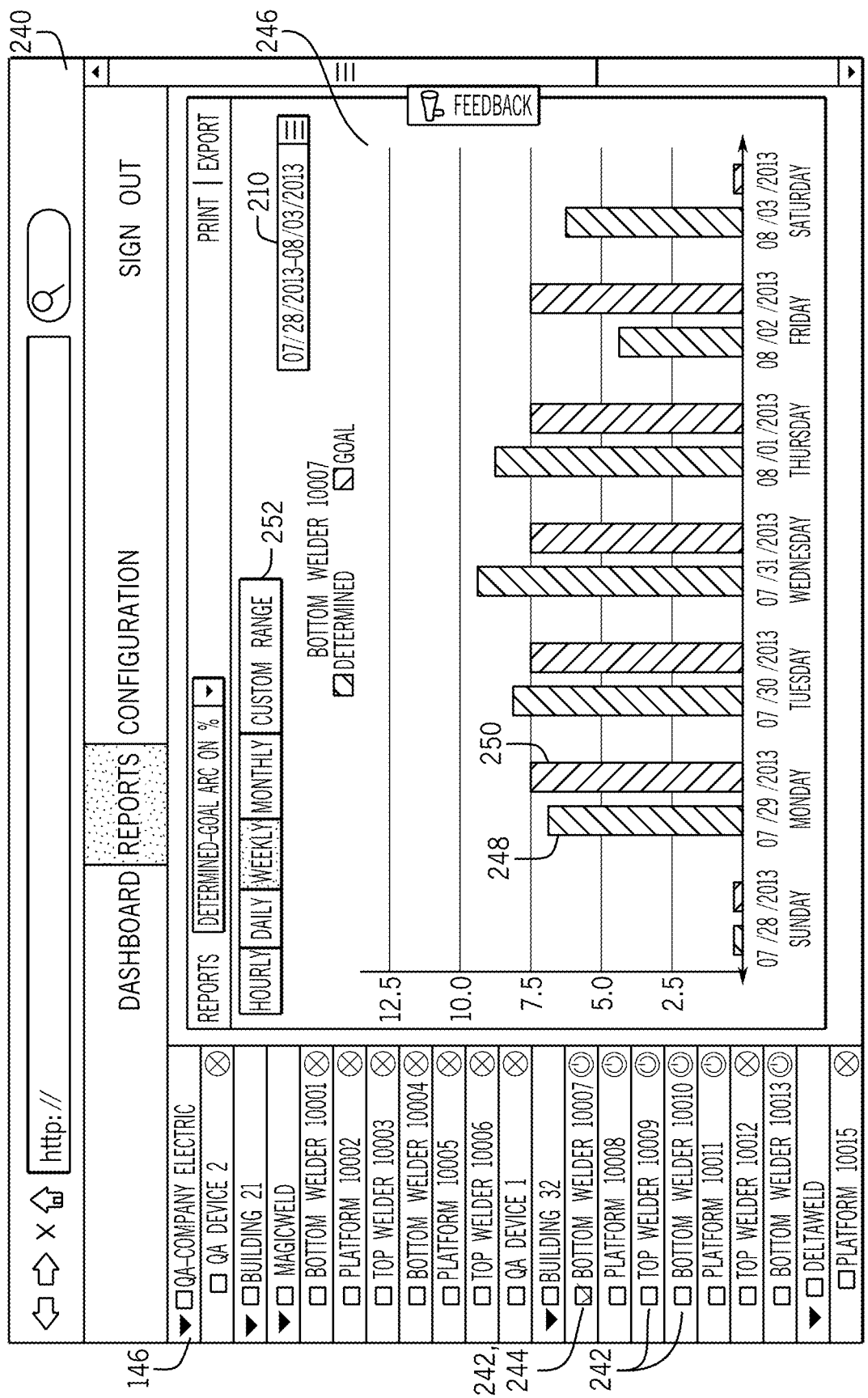
FIG. 15 is an exemplary web page view of a report page of a comparison of determined analyzed system parameters to goal analyzed system parameters.

FIG. 15 illustrates a reports page 240 that may facilitate comparing goals of analyzed system parameters stored in memory for one or more selected systems to determined analyzed system parameters of the one or more selected systems over one or more time periods (e.g., before and after an event). The various individual systems or groups 146 of welding systems 242 are available for selection and comparison. The reports page 240 displays these systems and allows users to click or select individual systems, groups, or any sub-group that is created at will. That is, while an entire group 146 of systems may be selected, the user may select individual systems or individual groups as indicated by reference numeral 244. A reports section 246 is provided in which a range of time periods 210 for a comparison may be selected, such as on an hourly, daily, weekly, or monthly basis, or any other range. Once the systems 242 and a time period 210 are selected, then, determined analyzed system parameters (e.g., arc on %, deposition) are compared to stored goals for the analyzed system parameters for the selected individual systems or individual groups 244.

In the illustrated example, arc on % has been selected as a basis for the comparison. The determined arc on % data for the selected system 244 is presented for each time period in a percentage basis by a vertical bar 248 adjacent to the goal arc on % value presented by a vertical bar 250. As may be appreciated, the goal arc on % value may be different for each time period. In some embodiments, the goal arc on % value is presented as a line across the reports section 246, and the line may illustrate a goal arc on % value for multiple time periods. In the reports page 240 shown in FIG. 15, the determined arc on % values meet or exceed the goal arc on % values for the dates Jul. 30-Aug. 1, 2013 and Aug. 3, 2013 (e.g., Tuesday, Wednesday, Thursday, and Saturday), and the determined arc on % values fall short of the goal arc on % values for the dates Jul. 29, 2013 and Aug. 2, 2013 (e.g., Monday and Friday). FIG. 15 illustrates an example for which the selected systems 244 were utilized approximately in accordance with the stored goals for the dates Jul. 29, 2013 to Aug. 1, 2013, the determined arc on % for the date Aug. 2, 2013 fell short of the goal arc on %, and the selected system 244 was utilized on the date Aug. 3, 2013 for which no goal arc on % was stored in memory or the goal arc on % was 0%. From the report page 240, the user may observe that arc on % for the selected system 244 peaked in the middle (e.g., Jul. 31, 2013) of the week, arc on % on Aug. 2, 2013 (e.g., Friday) sharply decreased, or the selected system 244 was utilized on Aug. 3, 2013 (e.g., Saturday), or any combination thereof. These observations may enable a user to adjust arc on % goals for the selected system 244 in view of productivity trends and/or to work with the operators of the selected welding system 244 to improve arc on % on Fridays and/or any given time for which productivity is decreased relative to other time periods. In some embodiments, the monitoring/analysis system 24 may analyze historic trends of analyzed system parameters relative to goals and generate projected trends for the analyzed system parameters for future time periods. The projected trends may be stored as goals for the future time periods. In some embodiments, the projected trends may be based at least in part on expected productivity improvements that affect the analyzed system parameters. For example, projected trends may account for greater productivity improvements after supplemental training. As another example, projected trends may be used to set arc on % goals for a shift that increase to a desired threshold, where the threshold is based at least in part on shift experience and/or shift training time.

In some embodiments, the user may compare the determined arc on % for one or more welding systems 242 to stored goals over various time ranges 252. The time ranges may include, but are not limited to hourly, daily, weekly, monthly, or any custom range. Through comparison of the determined analyzed system parameters to stored goals over various time ranges 252, the user may identify trends that may be useful for setting analyzed system parameter goals. After identifying trends (e.g., relative increase in arc on % to peak during middle of week and/or middle of shift, relative decrease in arc on % on Friday and/or end of shift), the user may adjust individual goals for one or more time periods to encourage increased performance for each time period. For example, the arc on % goal for Wednesdays or the middle of a shift may be set higher than the arc on % goal for Fridays or the end of a shift.

Figure 16:
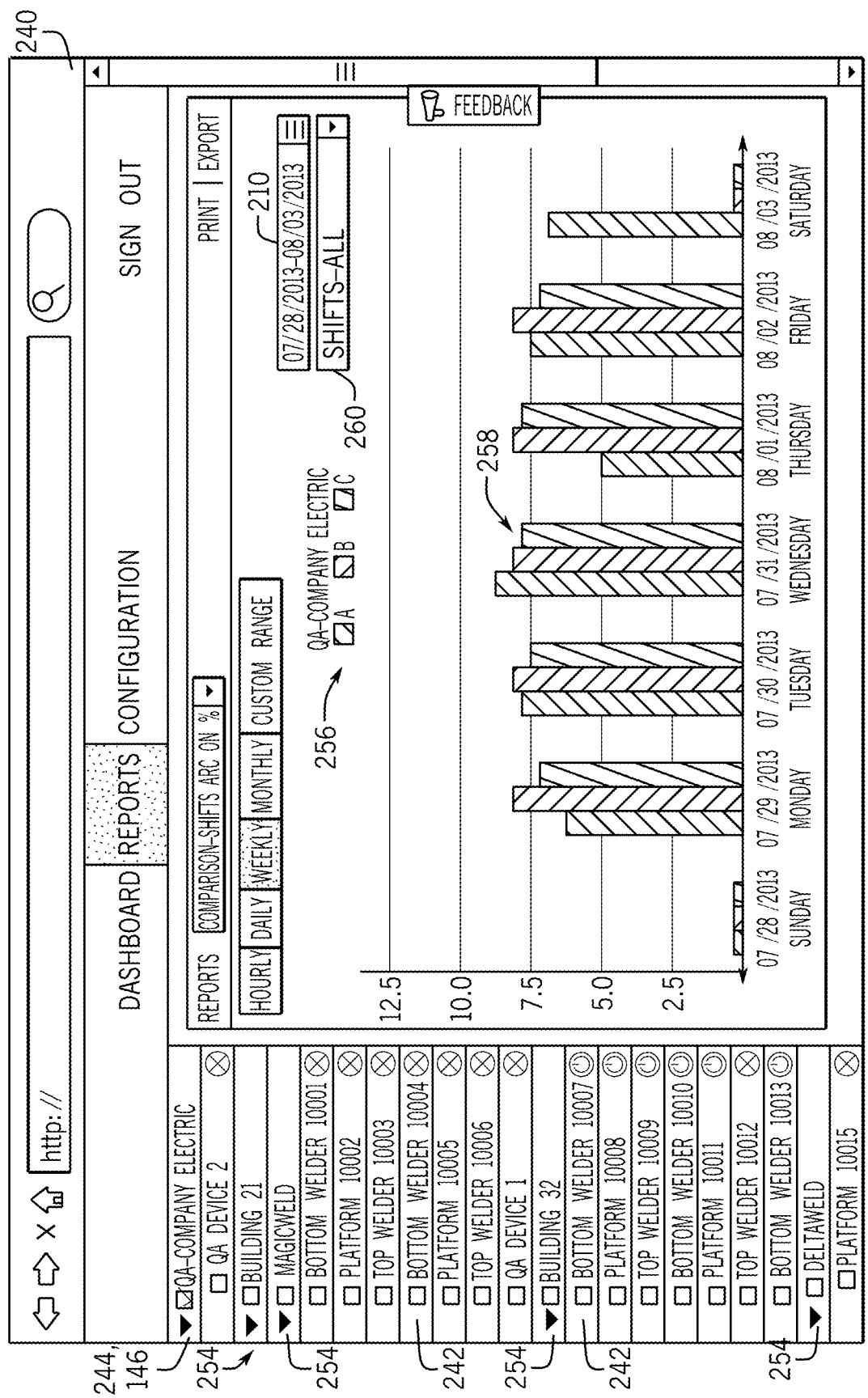
FIG. 16 is an exemplary web page view of a report page of a comparison between shifts of determined analyzed system parameters over a time period.

The user may compare determined analyzed system parameters for one or more groups of operators (e.g., shifts) utilizing selected systems or groups 244 of welding systems 242 over a time period 210. FIG. 16 illustrates an embodiment of a report page 240 that compares the arc on % for the selected group 244, and the selected group 244 includes multiple subgroups 254 of welding systems 242 that may be utilized during multiple shifts 256 (e.g., shift A, shift B, shift C). As may be appreciated, some welding systems 242 may be utilized by multiple shifts and/or by multiple operators. The report page 240 presents the arc on % analyzed system parameter for each of the shifts 256 as bars 258 over the selected time period 210 for comparison to one another. Additionally, or in the alternative, a report page 240 may present the deposition quantity, deposition rate, or other analyzed system parameter for multiple shifts or operators over the selected time period 210. The user may select a customized set of the groups 244 and the subgroups 254 of welding systems 242 for comparison of respective analyzed system parameters over the time period 210. In some embodiments, the user may select operators and/or shifts for comparison via a shift control 260. In some embodiments, the report page 240 may present acquired data from the time period 210 in addition to analyzed system parameters. Accordingly, the reports page may present analyzed system parameters for multiple types of comparisons.

The monitoring analysis circuitry may process the acquired data to determine the analyzed system parameters (e.g., arc on %, deposition, etc.) that are presented to a user. These analyzed system parameters may be presented on an initial page (e.g., dashboard) viewed by the user, thereby facilitating easy and rapid review of the relative status of one or more welding systems. The analyzed system parameters may be used for comparisons between welding systems, between welding operators, between a first group of welding systems to a second group of welding systems, between a first group of welding operators and a second group of welding operators, and so forth. The comparisons (e.g., graphical representations) may provide the user with more information than the acquired data alone. In some embodiments, the monitoring/analysis circuitry may facilitate visual comparisons of analyzed system parameters (e.g., arc on %, deposition) for a first group of one or more welding systems to itself as utilized by the same or different groups (e.g., shifts). The comparisons may be over a predefined time range (e.g., hourly, daily, weekly, monthly) or over a user defined time range. For example, the monitoring/analysis circuitry may present a comparison of the arc on % for a first welding system used by shift A over a week to the arc on % for the first welding system used by shift B over the same week or a different week. In some embodiments, the monitoring/analysis circuitry may facilitate visual comparisons of analyzed system parameters (e.g., arc on %, deposition, etc.) for the first group of one or more welding systems to a second group of welding systems utilized by the same or different groups (e.g., shifts). The comparisons may be over a predefined time range or over a user defined time range. For example, the monitoring/analysis circuitry may present a comparison of the deposition for a first welding system used by shift A on a date to the deposition for a second welding system used by shift A or shift B on the same or different date. As discussed above, the analyzed system parameters are determined by the monitoring/analysis circuitry at least in part from acquired data, while the analyzed system parameters are not directly acquired from the one or more welding systems.

In some cases, changes (e.g., changes that exceed a threshold over a set period of time, upward or downward trends, deviation from an average value, deviation from an expected value, variation beyond a set standard deviation value, step changes, etc.) in analyzed system parameters (e.g., arc on time, deposition, amount of spatter produced, parts produced per unit time, quality metrics, deviation form set quality limits, downstream repair rate, upstream preparation requirements, duration of a part, amount of consumables, etc.) may be due to system modifications, sudden changes, events (e.g., new automation installed, repair of equipment, new operator, etc.), or different practices in different manufacturing facilities rather than gradual changes (e.g., the increasing efficiency of one or more operators as their skills develop over weeks or months). Conventional monitoring systems require operators or managers to remember or otherwise keep track of such changes, and then cross check reports or pages to determine if that change resulted in a decrease or increase in productivity, efficiency, or other specific metrics. The techniques described herein allow for the creation of a tag for various events, which is stored with the collected weld data, rather than requiring a person to remember when specific events occurred or keep track of them in some other way (e.g., a notebook, calendar, spreadsheet, etc.). Once an event is created, reports may be run (e.g., querying the one or more databases 37) that determine differences in analyzed system parameters before and after the event in question, or comparing one manufacturing location in which the event occurred to a manufacturing location where the event did not occur. In some embodiments, analysis and reporting components 72 may be configured to detect changes (e.g., changes that exceed a threshold over a set period of time, upward or downward trends, deviation from an average value, deviation from an expected value, variation beyond a set standard deviation value, step changes, etc.) in analyzed system parameters or other metrics, to determine whether the change occurred around the time of a logged event, and/or to determine the event or events that may be causing the change. In some embodiments, if there is no logged event around the time of the detected change, the system may bring the change to an operator or manager's attention, and request that the operator or manager enter an event around the time of the change, if one is known.

FIG. 17 illustrates an exemplary add/edit event page 300. A user inputting a new event or editing a previously entered event may be presented this page 300 when prompted to log a new event. Page 300 may appear on a computer via software, on a web browser via a website, or via an application on a phone, tablet, or other handheld device. In other embodiments, there may be slightly different pages for adding an event and editing an event. New events may be logged as infrequently as once or twice a year, or as frequently as several times a day. In the present example, a new automated welding robot was installed on Mar. 18, 2015. It should be understood, however, that not all events may be manually entered. As will be described in more detail below, some events may be automatically generated based on data pushed from equipment or sensors. In some embodiments, an event may be automatically created and then the system may prompt a user for additional information about the event.

The name of the person inputting the event is designated in field 302. In some embodiments, field 302 may be used for another way to identify the person logging the event (e.g., employee identification number, job title, etc.). In other embodiments, the user may have previously signed into the system using login information, scanning a bar code or QR code identifying an employee (e.g., on an employee identification/access card). In such an embodiment, field 302 may be omitted.

The type of event is specified in field 304. In the embodiment shown in FIG. 17, the event type field 304 has a drop-down menu. In such an embodiment, frequently occurring or common events (e.g., automation installed, maintenance, new parts, new consumables, new operator, operator training completed, equipment repair, etc.) may be selectable by the user. In some cases, the drop down menu may include an "other" field, or similar designation that allows the user to input an event type different from those listed. In other embodiments, the event type may be selected from a list that is not a drop-down menu. In other embodiments, the event type field 304 may not include any provided options, but rather a blank space that the user fills in. In some embodiments, the event type field 304 may include nested categories. For example, events may be broken down into hardware focused events (e.g., automation installed, maintenance performed, new piece of equipment installed, equipment parts from new vendor, equipment software updated, equipment reprogrammed, new welding process used, etc.), process focused events (e.g., a change in the order of manufacturing processes performed, reorganizing the shop floor, modifying which operators perform which tasks, etc.), vendor focused events (e.g., consumables purchased from new vendor, consumables replaced, switch to different type of consumable, change in origin of consumables, parts from a new vendor, change in part materials, change in origin of parts, etc.), and personnel focused events (e.g., new operator, operator completes training, shift to new training protocol, union status of operators, etc.).

The date of the event is filled into the event date field 306. As with the event type field 304, the user may input the event date 306 into a blank space, from a drop down menu, by selecting the date from a drop down or pop up calendar graphic, or in some other way. The event editing page 300 may include an additional field 308 for comments and/or other information. Information in the comments page 308 may include part/model numbers for new installed parts, details regarding new operator information, a training course completed by the operator, etc. When the appropriate information has been entered, the event information is saved using the save button 310 and stored with the collected welding data (e.g., in the one or more databases 37). It should be understood, however, that the illustrated event editing page 300 is merely an example, and that other embodiments may use different windows or pages to obtain event information.

Figure 18:
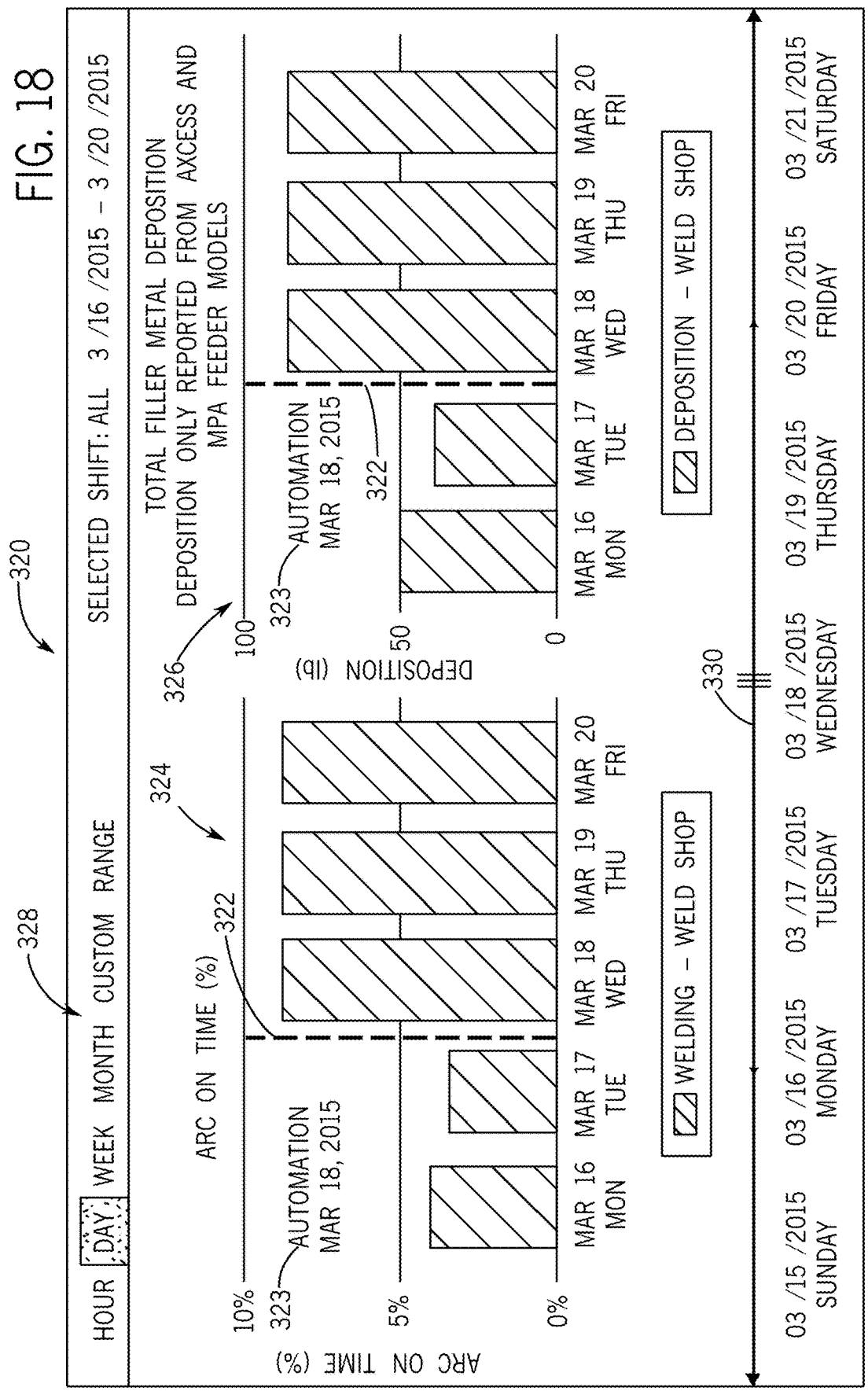
FIG. 18 is an exemplary event report page in accordance with aspects of the present disclosure.

Once one or more events have been added to the stored data, databases 37, or distributed data, a search (e.g., database query) may be run for the analyzed system parameters before and after the event. A report may then be generated to present the information to a user or manager. It should be understood that some industries may have different manufacturing goals. For example, manufacturers in the aerospace sector may be more focused on manufacturing quality and meeting tight tolerances, whereas a company making dumpsters may be more focused on production quantity than quality. Similarly, manufacturers in various sectors may emphasize quality, total volume produced, cost of production, material waste, etc. FIG. 18 shows a sample event report 320. In certain embodiments, upon requesting a report 320, a first query (e.g., database query) is run to collect arc on time before the event. For example, the query may be:

```
SELECT day(weldstart) as data, SUM(duration) as Arc_on_time
FROM weld_history_table
WHERE location = "Weld Shop"
    and weldstart > [lower_bound _before_event]
    and weldstart < [event_date]
GROUP BY day(welddstart)
```

A second query (e.g., database query) may be run to collect the arc on time after the event:

```
SELECT day(weldstart) as data, SUM(duration) as Arc_on_time
FROM weld_history_table
WHERE location = "Weld Shop"
    and weldstart >= [event_date ]
    and weldstart < [upper_bound_after_event]
GROUP BY day(welddstart)
```

Referencing the example of FIG. 18, the variable "lower_bound_before_event" is Monday, March $16^{th}$ in. In the second query, another variable ("upper_bound_after_event") is Friday March $20^{th}$. The event date in this example is March $18^{th}$. The arc on time, or other analyzed system parameter, before and after the event may then be compared and plotted over time to see a clearer picture. The value in the technique increases as the complexity of the queries and subsequent reported data increases and unforeseen correlations emerge.

As with the add/edit event page 300, the report 320 may appear via software, website, or application on a computer, phone, tablet, or other handheld device. In the example shown, a new automation robot was installed before the start of business on Wednesday, Mar. 18, 2015. The event is shown in the report 320 by line 322, which may be solid or dotted. In some embodiments, the report 320 may include a window 323 showing the event type and the date and time of the event. The event report 320 shown in FIG. 18 includes an arc on time graph 324 and a deposition graph 326; however, other embodiments may include fewer graphs or a greater number of graphs. Additionally, other embodiments of the report 320 may include graphs for other analyzed system parameters. Though the report 320 in FIG. 18 shows bar graphs, as with other reports previously discussed, the report may include line graphs, tables, or other representations of analyzed system parameters. Additionally, as with other reports, the event report 320 may be run for an operator, a piece of welding equipment, a weld cell, a group of welding equipment, a shop, a facility, a factory, a part, an operator, etc. A user may select from several range options 328 (e.g., hourly, daily, weekly, monthly) or insert a custom range. The event report 320 may also include a range slider 330 that allows the user to crop or extend the time range shown in the graphs 324, 326 relative to the event 322. As with the other reports shown, it should be understood that the illustrated event report 320 is merely one possible embodiment. Other possible event reports 320 may include multiple events, different graphs, tables or graphs analyzing the differences in tracked system parameters before and after the event, and so forth. Further, though the event report 320 shows tracked parameters (e.g., arc on time percentage and deposition) before and after the event 322, in other embodiments, the event report 320 may compare parameters from a facility or weld cell where the event occurred to a facility or weld cell where the event did not occur.

Figure 19:
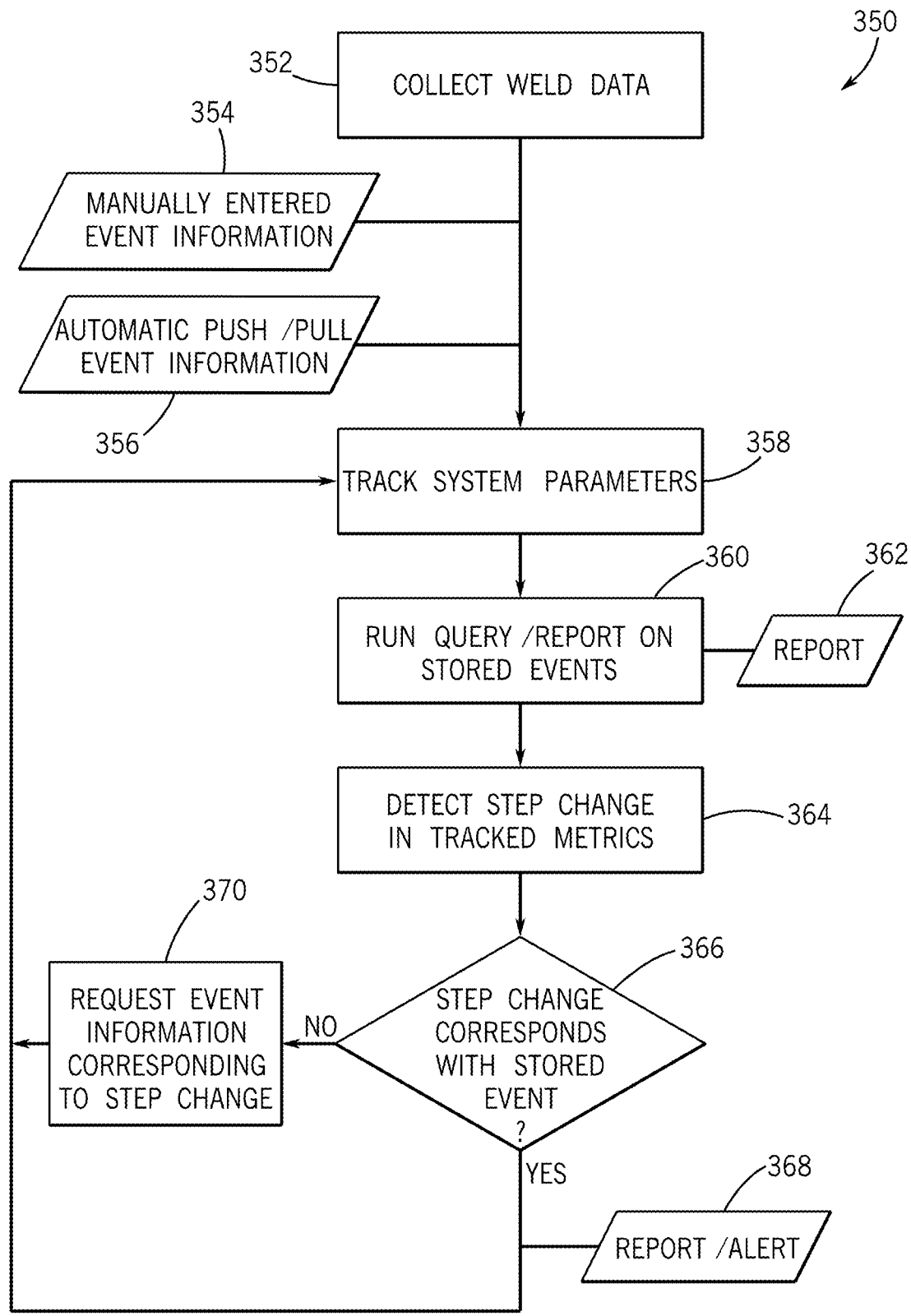
FIG. 19 is a flow chart for a process of keeping track of events for one or more welding systems in accordance with aspects of the present disclosure.

FIG. 19 is a flow chart for one embodiment of a process 350 for analyzing system parameters relative to one or more events for one or more welding systems 12. In block 352, the process 350 collects weld data. In some embodiments, the collected data may be stored in a database (e.g., the one or more databases 37 illustrated in FIG. 3). Collected weld data may include arc on time, deposition, another system parameter previously discussed, or any other welding or manufacturing data that may be collected. Manually entered event information 354 may be input during this time. Additionally, some systems may be set up to automatically push and/or pull specific event information 356. For example, a control system or an automation system may automatically log an event when software updates are installed, or a system may wireless record the presence of the RFID tag identifying a particular operator, part, or work order. Components in the system may be set up to automatically create event information 356 when certain events take place, which may then be pushed/pulled to the process 350. Sensors (e.g., RFID tags/sensors, near field communication (NFC) devices, or personal allocated devices, such as phones, tablets, watches, helmets, gloves, temperature sensors, etc. may push event data). For example, events may be created based on a work order, a lot number of a consumable, an operator ID, enterprise resource planning (ERP) data, manufacturing execution system data, personnel data, training records, time of day, weather, humidity, temperature, etc. In some embodiments, an event may be automatically created and then the user may be prompted to add supplemental information to the event data.

In block 358, the process tracks analyzed system parameters. This may include determining, via a processor, one or more analyzed system parameters from the collected data. These parameters may include arc on time, deposition, other previously discussed welding system parameters, or any other manufacturing metric of interest. In block 360, the process 350 runs a query (e.g., database query) or report on stored events. In some embodiments, the process 350 may generate a report 362 for every event logged. For example, the process 350 may populate a user-viewable dashboard page with graphical indicia representative of one or more analyzed system parameters before and after the event. For example, the graphical indicia may include charts, graphs, plots, and maps to help a user visualize trends, rankings, deviations, correlations, comparisons, etc. The user-viewable dashboard page may then be transmitted to the user. In other embodiments (e.g., systems with a large number of events logged), the process 350 may only generate a report 362 when there is a substantial change (e.g., changes that exceed a threshold over a set period of time, upward or downward trends, deviation from an average value, deviation from an expected value, variation beyond a set standard deviation value, step changes, etc.) in the tracked analyzed system parameters corresponding to the event.

In block 364, the process 350 may be configured to detect changes indicative of an influencing agent in one or more analyzed system parameters (e.g., changes that exceed a threshold over a set period of time, upward or downward trends, deviation from an average value, deviation from an expected value, variation beyond a set standard deviation value, step changes, etc.). When a substantial change indicative of an influencing agent (e.g., changes that exceed a threshold over a set period of time, upward or downward trends, deviation from an average value, deviation from an expected value, variation beyond a set standard deviation value, step changes, etc.) in analyzed system parameters is detected, the process 350 determines at node 366 whether the detected change corresponds with a logged event. In some embodiment, the process 350 may conduct analysis to determine a correlation to a root cause (e.g., different parts, different consumables, different operators, different weather conditions, new lighting installed, etc.). The process 350 may utilize statistics, "big-data" analytics, curve fitting, linear fitting, modeling, etc. to determine if one or more factors may be associated with the change. If the change does correspond with an event, the process 350 may query the one or more databases and/or generate a report 368 or an alert (e.g., an email, a text message, a pop up window, a notification, etc.). For example, the process 350 may automatically run a report 368 or prompt the user to select whether they would like to run a report 368. As previously discussed, the report 368 may be a populated user-viewable dashboard page with graphical indicia representative of one or more analyzed system parameters before and after the event that is transmitted to the user.

In block 370, if the change does not correspond to a logged event, the process 350 may ask the user if an event occurred within a given time frame or request that the user input event information for a given time. The process 350 then returns to tracking analyzed system parameters in block 358.

The disclosed techniques may be used to help operators and managers identify how various changes positively and negatively affect tracked productivity parameters. For example, in one embodiment, the event in question may be related to hardware. A manufacturing entity may replace a human operator with an automated system, perform maintenance on a piece of equipment, replace an old piece of equipment with a new piece of equipment, obtain parts for their manufacturing equipment from a different vendor, update equipment software, reprogram equipment, or begin using a new welding process on their welding system. Using the disclosed techniques, a manager may look at various productivity metrics before and after the equipment change was made and note that the change resulted in significant increases or decreases in that productivity metric. In some embodiments, a change in the productivity may be detected and brought to the manager's attention. If the change results in an increase in productivity, management may choose to proliferate that change where appropriate throughout its operations. On the other hand, if the change results in a decrease in productivity, management may choose to reverse the change or choose not to proliferate the change throughout its operations, and seek alternative options to the change.

In some cases the event may be related to consumables. For example, a welding operation may notice a significant switch from a first electrode wire vendor to a second electrode wire vendor and notice a substantial increase or decrease in spatter. As a result, the quality of welds may improve or degrade. If the quality of the welds suffer too much, management may decide that the switch to a less expensive electrode wire vendor is not worth the cost savings. Similarly, a manufacturing operation may switch to a different vendor for component parts. Using the disclosed techniques, management may realize that productivity increases because a larger number of component parts meet specification, and thus a larger percentage of produced products pass quality control tests. Management may then decide to expand the number of parts they get from the new vendor. Alternatively, management may realize that a larger number of component parts from the new vendor do not meet specification, and thus a larger percentage of produced products are not passing quality control, leading to reduced productivity and product quality. Accordingly, management may choose to return to the old part vendor, or find an alternative part vendor.

In other cases, the event may be related to process changes. For example, a manufacturing operation may rearrange or redesign a space where manufacturing happens. The operation may change which operators perform what task, which processes take place, what steps are included in the process, the order of processes or steps in a process, time between processes or process steps, conditions (e.g., temperature, pressure, etc.) at which processes occur, and so forth. These process changes may lead to significant increases or decreases in productivity metrics. Based on these increases or decreases, management may proliferate these changes to other areas, make similar changes to other areas, revert back to old processes, or look for alternatives.

The event may also correspond to personnel. For example, a manufacturing operation may implement a new training program that is incredibly effective, quickly increasing the skill of operators and increasing productivity. A manager of a team may complete a training program, or the team may attend a training program together that improves the ability of the team to work together to increase productivity. In another example, a manufacturing entity may move to a different schedule, working longer shifts over few days, or shorter shifts over more days that results in increased or decreased productivity. Alternatively, the manufacturing operation may change to a new management style or a new organizational structure that hurts productivity. Based on these changes, management may decide to continue to implement the change more broadly, to go back to the way things were done before the change, or to explore other options.

In addition, the disclosed techniques may be used to determine that two facilities located in two different locations producing the same part have vastly different productivity or product quality metrics and help determine possible causes of the discrepancy. For example, a manufacturing location in Georgia may produce a much greater number of products per week than a facility making the same part in Indiana. Similarly, management may use the disclosed techniques to determine that parts made at the facility in Indiana may be superior to the same parts made in a facility in Taiwan. The disclosed techniques may help management identify the discrepancy and determine what factors may be contributing to that discrepancy (e.g., component part suppliers, whether conditions, union status, employee retention, employee morale, work schedules, etc.). Accordingly, management may make changes aimed at helping a manufacturing operation meet its goals in terms of production, quality, cost, etc. It should be understood that these use cases are merely examples of how the disclosed techniques may be applied in the real world. Accordingly, these use cases are not intended to limit the claims. Many other possible examples of applications for the disclosed techniques are also envisaged.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A metal fabrication performance monitoring method comprising:
 collecting fabrication data during one or more metal fabrication operations;
 receiving event data comprising an event and a time that the event occurred, the event comprising an equipment change, personnel change, or process change;
 via at least one computer processor, determining a first analyzed system parameter from the fabrication data;
 via the at least one computer processor, populating a dashboard page with first graphical indicia representative of the event, and second graphical indicia representative of the first analyzed system parameter before and after the event; and
 transmitting the dashboard page to a user-viewable display.

2. The method of claim 1, wherein the event comprises installation of equipment, maintenance of equipment, a change of software, a change in an origin of consumables, a change in an origin of parts, a change of operator, a change in a workspace, a completion of a training course by an operator, or an implementation of a new training protocol.

3. The method of claim 1, wherein the fabrication data comprises arc start data, arc duration data, electric current data, electric voltage data, switch closure data, operator identification data, operator presence data, or wire feed rate data.

4. The method of claim 1, wherein the first analyzed system parameter comprises a quality metric.

5. The method of claim 1, wherein the first analyzed system parameter comprises an arc on time percentage, a deposition quantity, a deposition rate, a spatter amount, a part production rate, or a repair rate.

6. The method of claim 1, wherein the event data is automatically pushed to or pulled from a piece of equipment, a part, or a sensor.

7. The method of claim 6, wherein the event data is automatically generated based on a work order, a lot number of a consumable, an operator identification, enterprise resource planning data, manufacturing execution system data, personnel data, training records, time of day, weather, humidity, temperature, or a combination thereof.

8. The method of claim 1, wherein the event data is received from memory.

9. The method of claim 1, wherein the first graphical indicia identifies a type of the event and the time that the event occurred.

10. The method of claim 1, further comprising populating the dashboard page with timing indicia identifying the time that the event occurred, a date or time of the first analyzed system parameter before the event, and a date or time of the first analyzed system parameter after the event.

11. A manufacturing performance monitoring method comprising:
 collecting manufacturing data during a manufacturing operation;
 via at least one computer processor, determining a first analyzed system parameter from the manufacturing data;
 detecting a change in the first analyzed system parameter beyond a threshold value;
 determining whether the change occurred proximate in time with a known event, the known event comprising an equipment change, personnel change, or process change;
 in response to determining the change did occur proximate in time with the known event, via the at least one computer processor, populating a dashboard page with first graphical indicia representative of the known event and second graphical indicia representative of the first analyzed system parameter before and after the known event; and
 transmitting the dashboard page to a user viewable display.

12. The method of claim 11, further comprising requesting additional event data representative of an event in response to determining the change in the first analyzed system parameter did not occur proximate in time with the known event.

13. The method of claim 12, wherein the event comprises installation of equipment, maintenance, installation of equipment, a change of software, a change in an origin of consumables, a change in an origin of parts, a change of operator, a change in a workspace, a completion of a training course by an operator, or an implementation of a new training protocol.

14. The method of claim 12, wherein the manufacturing data comprises arc start data, arc duration data, electric current data, electric voltage data, switch closure data, operator identification data, operator presence data, or wire feed rate data.

15. The method of claim 12, wherein the first analyzed system parameter comprises a quality metric.

16. The method of claim 12, wherein the first analyzed system parameter comprises an arc on time percentage, a deposition quantity, a deposition rate, a spatter amount, a part production rate, or a repair rate.

17. The method of claim 12, comprising:
 via the at least one computer processor, determining a second analyzed system parameter from the manufacturing data; and
 via the at least one computer processor, populating the dashboard page with third graphical indicia representative of the second analyzed system parameter before and after the event occurred.

18. A non-transitory tangible computer readable medium comprising executable instructions that, when executed, cause a processor to:
 collect fabrication data during one or more metal fabrication operations;
 receive event data comprising an event and a time that the event occurred, the event comprising an equipment change, personnel change, or process change;
 determine a first analyzed system parameter from the fabrication data;
 populate a dashboard page with first graphical indicia representative of the event and second graphical indicia representative of the first analyzed system parameter before and after the event; and
 transmit the dashboard page to a user-viewable display.

19. The non-transitory tangible computer readable medium of claim 18, wherein the executable instructions comprise instructions that when executed cause the processor to automatically push event data to or pull event data from a piece of equipment, a part, or a sensor.

20. The non-transitory tangible computer readable medium of claim 19, wherein the executable instructions comprise instructions that when executed cause the processor to automatically generate event data based on a work order, a lot number of a consumable, an operator identification, enterprise resource planning data, manufacturing execution system data, personnel data, training records, time of day, weather, humidity, temperature, or a combination thereof.

21. The non-transitory tangible computer readable medium of claim 18, wherein the executable instructions comprise instructions that when executed cause the processor to detect a change in the first analyzed system parameter beyond a threshold value, and prompt the user to input supplemental event data regarding the change in the first analyzed system parameter if the change in the first analyzed system parameter does not correspond with received event data.

22. The non-transitory tangible computer readable medium of claim 18, wherein the event comprises installation of equipment, maintenance of equipment, a change of software, a change in an origin of consumables, a change in origin of parts, a change of operator, completion of a training course by an operator, or implementation of a new training protocol.

* * * * *